United States Patent [19]
Nishimura

[11] Patent Number: 5,717,662
[45] Date of Patent: Feb. 10, 1998

[54] SUPER-RESOLUTION MAGNETO-OPTICAL RECORDING MEDIUM USING MAGNETOSTATIC COUPLING AND INFORMATION REPRODUCTION METHOD USING THE MEDIUM

[75] Inventor: Naoki Nishimura, Tokyo, Japan

[73] Assignee: Canon Kabushiki Kaisha, Tokyo, Japan

[21] Appl. No.: 644,157

[22] Filed: May 10, 1996

[30] Foreign Application Priority Data

| May 12, 1995 | [JP] | Japan | 7-114531 |
| May 15, 1995 | [JP] | Japan | 7-116097 |
| May 15, 1995 | [JP] | Japan | 7-116100 |

[51] Int. Cl.$^6$ ............................................. G11B 11/00
[52] U.S. Cl. .................................... 369/13; 428/694 MM
[58] Field of Search ............................ 369/13, 14, 110; 360/59, 114; 365/122; 428/694 ML, 694 MM, 694 EC, 694 TM

[56] References Cited

U.S. PATENT DOCUMENTS

| 5,208,797 | 5/1993 | Nakaki et al. | 369/13 |
| 5,208,799 | 5/1993 | Nakao et al. | 369/13 |
| 5,218,581 | 6/1993 | Ohta et al. | 369/13 |

FOREIGN PATENT DOCUMENTS

| 3-93056 | 4/1991 | Japan. |
| 3-93058 | 4/1991 | Japan. |
| 4-255938 | 9/1992 | Japan. |

*Primary Examiner*—Tan Dinh
*Attorney, Agent, or Firm*—Fitzpatrick, Cella, Harper, & Scinto

[57] ABSTRACT

A magneto-optical recording medium includes a reproducing layer for contributing to reproduction, a recording layer for storing information, and an intermediate layer disposed between the reproducing and recording layers. The intermediate layer magnetostatically couples the reproducing layer and the recording layer in an entire area between the two layers. The reproducing layer has a compensation temperature between room temperature and a Curie temperature thereof. Sublattice magnetizations in the reproducing layer and recording layer are oriented in opposite directions at one of a temperature lower than the compensation temperature and a temperature higher than the compensation temperature, and are oriented in the same direction in the other of a temperature lower than the compensation temperature and a temperature higher than the compensation temperature.

17 Claims, 8 Drawing Sheets

TEMPERATURE DISTRIBUTION IN TRACK CENTER

RADIAL DIRECTION
TEMPERATURE DISTRIBUTION
IN TRACK CENTER

TEMPERATURE DISTRIBUTION
IN TRACK CENTER

SUPER-RESOLUTION MAGNETO-OPTICAL RECORDING MEDIUM USING MAGNETOSTATIC COUPLING AND INFORMATION REPRODUCTION METHOD USING THE MEDIUM

BACKGROUND OF THE INVENTION

1. Field of the Invention

The present invention relates to a magneto-optical recording medium for recording and reproducing information with a laser beam by using a magneto-optical effect and also relates to a magneto-optical reproduction method and a magneto-optical recording medium capable of increasing the density of the medium.

2. Related Background Art

As a rewritable high-density recording method, a magneto-optical recording medium is attracting attention, in which information is recorded by writing a magnetic domain in a thin magnetic film by using the thermal energy of a semiconductor laser and from which the recorded information is read out by using a magneto-optical effect. Recently, it is increasingly required to raise the recording density of this magneto-optical recording medium to obtain a recording medium with a larger capacity.

The linear recording density of an optical disk, such as this magneto-optical recording medium, largely depends upon the laser wavelength of a reproducing optical system and the numerical aperture of an objective lens. That is, the diameter of a beam is determined when a laser wavelength λ of a reproducing optical system and a numerical aperture NA of an objective lens are determined. Accordingly, a mark period which can be reproduced and detected is limited to approximately λ/2NA.

On the other hand, the track density is primarily restricted by a crosstalk. This crosstalk is principally determined by the distribution (profile) of a laser beam on the surface of a medium and is represented by the same function of λ/2NA as the mark period.

To realize a high density by using conventional optical disks, therefore, it is necessary to shorten the laser wavelength of a reproducing optical system and increase the numerical aperture NA of an objective lens. However, shortening the laser wavelength is not easy because this decreases the efficiency of a device or generates heat. On the other hand, if the numerical aperture of an objective lens is increased, the distance between the lens and the disk becomes too small and this poses a mechanical problem, such as collision between the disk and the optical system. For these reasons, technologies of increasing the recording density by improving the recording medium construction or the recording medium reading method are being developed.

As an example, Japanese Patent Application Laid-Open No. 3-93056 has attempted to increase the recording density by using a medium consisting of a reproducing layer, an intermediate layer, and a recording layer. In this method, a medium consisting of a reproducing layer, an intermediate layer, and a recording layer is moved at a certain linear velocity, and a light spot is formed on the medium. In the resultant temperature distribution of the medium, magnetizations in the reproducing layer in a high-temperature region are uniformly aligned in the direction of an external magnetic field, so that domain information in the recording layer is transferred only to the reproducing layer in a low-temperature region and is reproduced. This reduces inter-symbol interference during reproduction and enables reproduction of a signal of a period smaller than the diffraction limit of light. In this way, the method has attempted to increase the recording density.

Japanese Patent Application Laid-Open No. 3-93058 has attempted to increase the recording density by using a medium basically consisting of a reproducing layer and a recording layer. That is, as illustrated in FIGS. 1A to 1C, a medium (FIG. 1B) consisting of a reproducing layer 1, an auxiliary layer 2, an intermediate layer 3, and a recording layer 4 is moved (in a moving direction 9) at a given linear velocity. Prior to information reproduction, domain information in the recording layer 4 is masked by aligning magnetizations in the reproducing layer 1 in the same direction by using an initialization magnetic field 12, and a light spot is formed on the medium. In a high-temperature region in the resultant temperature distribution (FIG. 1C) of the medium, the effective size of a reproduction spot is decreased by transferring the domain information in the memory layer 3 to the reproducing layer 1 with the aid of a reproduction magnetic field 11. This allows reproduction of a recording mark smaller than the diffraction limit of light. In this manner, the method has attempted to increase the linear density and the recording density.

Unfortunately, in order to obtain a high S/N (C/N) ratio in the magneto-optical recording media described in Japanese Patent Application Laid-Open Nos. 3-93056 and 3-93058, it is necessary to increase the film thickness of the reproducing layer so as to mask domain information in the recording layer. More specifically, as described in Japanese Patent Application Laid-Open No. 4-255938, super-resolution reproduction is impossible if the film thickness of the reproducing layer is 15 nm or less, since the influence of the layer below the reproducing layer becomes 25% or more. The reproducing layer must have a film thickness of 20 nm in order to obtain a necessary signal, and practically, a film thickness of 30 nm or more is necessary. That is, since domain information in the recording layer must be masked in the magneto-optical recording media described above, it is not possible to reduce the film thickness of the reproducing layer and hence the total film thickness of all magnetic layers.

Recently, it is increasingly required to raise the recording density of a magneto-optical recording medium by increasing its linear velocity. However, a medium in which a magnetic layer has a large film thickness has a high thermal capacity as a whole, and so a high optical power is required in recording. Since the output of the optical power of, e.g., a semiconductor laser, is limited, it is difficult for the conventional magneto-optical recording media to meet this demand. Also, it is not possible to raise the C/N ratio by forming a reflection layer to obtain an enhanced structure.

Furthermore, rare earth metals having high material costs are in many instances used as the magnetic materials. Therefore, the material cost of a medium is increased if a magnetic layer with a large thickness is formed, and this makes it difficult to provide an inexpensive magneto-optical recording medium.

Accordingly, it is difficult for these conventional magneto-optical recording media and methods to simultaneously realize a high density and high-speed recording by magnetic super-resolution and provide an inexpensive magneto-optical recording medium.

Also, in the conventional magneto-optical recording media and methods, it is necessary to apply an external magnetic field to perform reproduction. Consequently, it is difficult to realize a high density by magnetic super-resolution with an inexpensive magneto-optical recording apparatus.

SUMMARY OF THE INVENTION

The present invention has been made in consideration of the above situation, and has as its object to realize magnetic super-resolution by using a magneto-optical recording medium in which all magnetic layers are thin films, and to provide a low-material-cost, high-density magneto-optical recording medium capable of high-speed recording and a high-performance information recording/reproduction method using the medium.

The above object of the present invention is achieved by a magneto-optical recording medium comprising a reproducing layer for contributing to reproduction, a recording layer for storing information, and an intermediate layer arranged between the reproducing layer and the recording layer to magnetostatically couple at least portions of the reproducing layer and the recording layer at room temperature and/or an elevated temperature, wherein sublattice magnetizations in the reproducing layer and the recording layer are oriented in opposite directions in at least a portion of the magnetostatically coupled portions and are oriented in the same direction in a remaining portion.

Also, the above object of the present invention is achieved by an optical information reproduction method which reproduces information by using a light spot from a magneto-optical recording medium including a reproducing layer for contributing to reproduction, a recording layer for storing the information, and an intermediate layer arranged between the reproducing layer and the recording layer to magnetostatically couple at least portions of the reproducing layer and the recording layer at room temperature and/or an elevated temperature, wherein sublattice magnetizations in the reproducing layer and the recording layer are oriented in opposite directions in at least a portion of the magnetostatically coupled portions and are oriented in the same direction in a remaining portion, comprising the steps of forming a light spot on the reproducing layer, setting at least a partial region in the light spot into a magnetostatically coupled state in which the sublattice magnetizations in the reproducing layer and the recording layer are oriented in opposite directions and setting a remaining region in the light spot into a state in which the sublattice magnetizations in the reproducing layer and the recording layer are oriented in the same direction, and reproducing the information by detecting reflected light of the light spot.

Details of the invention will be explained in the embodiments to be described later.

BRIEF DESCRIPTION OF THE DRAWINGS

FIGS. 1A to 1C are views for explaining a conventional super-resolution magneto-optical reproduction method, in which FIG. 1A shows an aperture and a mask in a light spot, FIG. 1B shows the film arrangement and the magnetized state during reproduction of a conventional magneto-optical recording medium, and FIG. 1C shows the temperature distribution of the medium during reproduction;

FIGS. 2A to 2C are schematic views showing the film arrangements of a medium of the present invention, in which FIG. 2A shows the basic arrangement of the medium of the present invention, and FIGS. 2B and 2C illustrate the arrangements of examples of the medium of the present invention;

FIGS. 3A to 3C are views for explaining a magneto-optical reproduction method according to the first embodiment of the present invention, in which FIG. 3A shows an aperture and a mask in a light spot, FIG. 3B shows the film arrangement and the magnetized state during reproduction of one example of the magneto-optical recording medium of the present invention, and FIG. 3C shows the temperature distribution of the medium during reproduction;

FIGS. 4A to 4C are views for explaining another example of the magneto-optical reproduction method according to the first embodiment of the present invention, in which FIG. 4A shows an aperture and a mask in a light spot, FIG. 4B shows the film arrangement and the magnetized state during reproduction of one example of the magneto-optical recording medium of the present invention, and FIG. 4C shows the temperature distribution of the medium during reproduction;

FIGS. 5A and 5B are schematic views showing the film arrangements of a medium according to the second embodiment of the present invention, in which FIG. 5A shows the basic arrangement of the medium of the present invention and FIG. 5B shows the arrangement of one example of the medium of the present invention;

FIGS. 6A to 6C are views for explaining a magneto-optical reproduction method according to the second embodiment of the present invention, in which FIG. 6A shows an aperture and a mask in a light spot, FIG. 6B shows the film arrangement and the magnetized state during reproduction of one example of the magneto-optical recording medium of the present invention, and FIG. 6C shows the temperature distribution of the medium during reproduction;

FIGS. 7A to 7C are schematic views showing the film arrangements of a medium according to the third embodiment of the present invention, in which FIG. 7A shows the basic arrangement of the medium of the present invention, and FIGS. 7B and 7C illustrate the arrangements of examples of the medium of the present invention; and FIGS. 8A to 8C are views for explaining a magneto-optical reproduction method according to the third embodiment of the present invention, in which FIG. 8A shows an aperture and a mask in a light spot, FIG. 8B shows the film arrangement and the magnetized state during reproduction of one example of the magneto-optical recording medium of the present invention, and FIG. 8C shows the temperature distribution of the medium during reproduction.

DETAILED DESCRIPTION OF THE PREFERRED EMBODIMENTS

[First Embodiment]

A magneto-optical recording medium and a recording/reproduction method using the medium according to the first embodiment of the present invention will be described in detail below with reference to the accompanying drawings.

In the following description, a first magnetic layer will be referred to as a reproducing layer, and a second magnetic layer will be referred to as a recording layer.

Figure 1A:
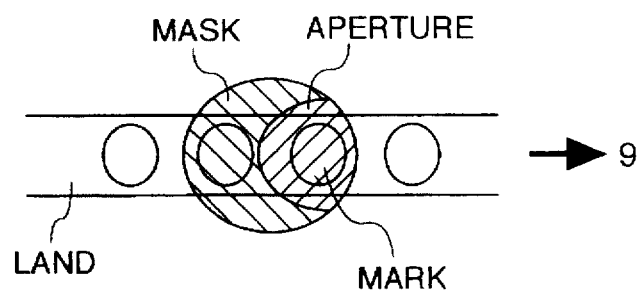
Figure 1B:
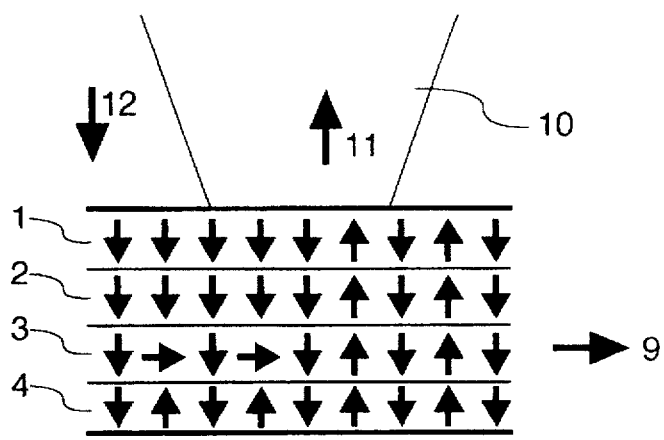
Figure 1C:
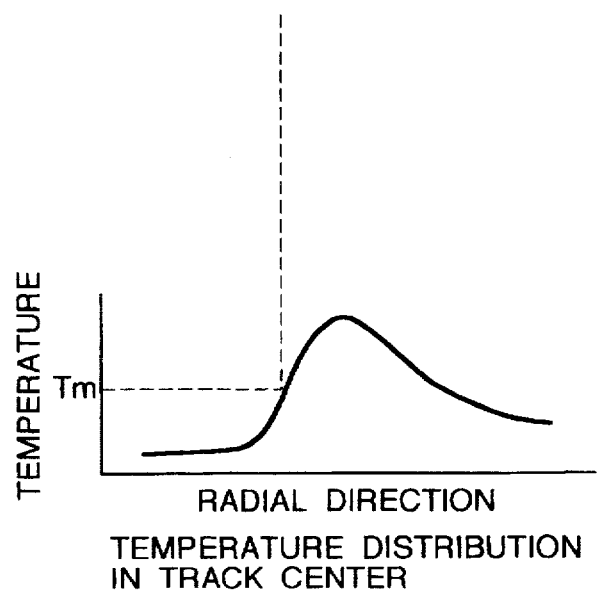
Figure 2A:
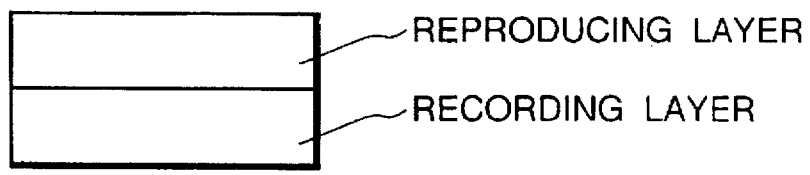
Figure 2B:
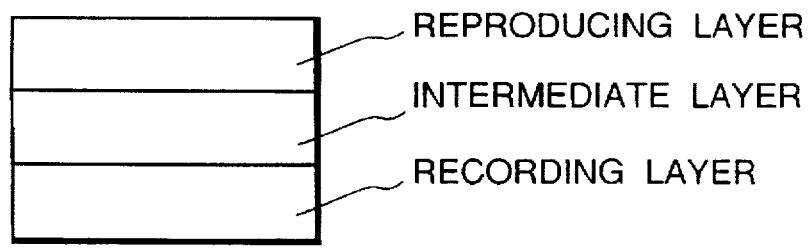
Figure 2C:
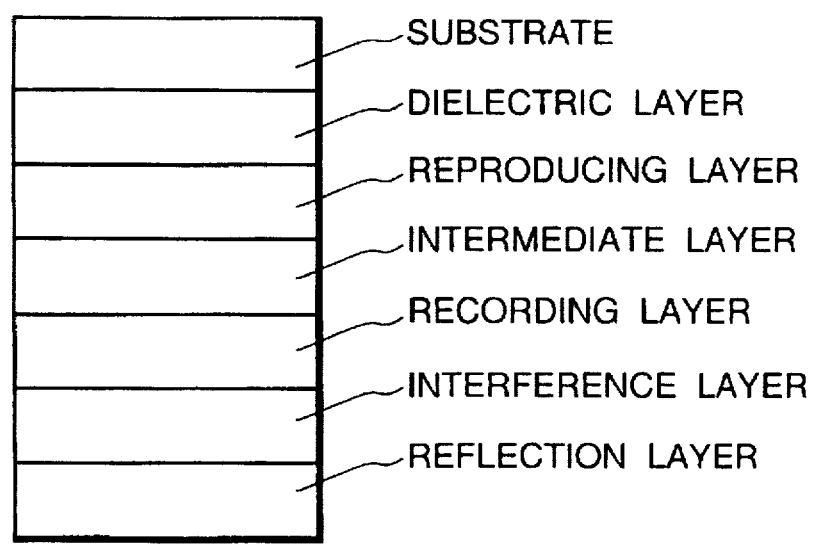

As illustrated in FIGS. 2A to 2C, this magneto-optical recording medium of the present invention is manufactured by stacking at least a reproducing layer and a recording layer in this order from the light incident surface on a substrate.

The reproducing layer is preferably made from a ferrimagnetic substance and has a compensation temperature between room temperature and a Curie temperature. The reproducing layer and the recording layer magnetostatically couple with each other at room temperature and the elevated temperatures, and overall magnetizations in these layers are oriented in the same direction.

The magneto-optical recording media of the present invention are classified into two types (1) and (2) described below.

(1) A two-layered arrangement in which the sublattice magnetic moments of the reproducing layer and the recording layer are in opposite directions at temperatures lower than the compensation temperature of the reproducing layer and in the same direction at temperatures higher than the compensation temperature.

(2) A two-layered arrangement in which the sublattice magnetic moments of the reproducing layer and the recording layer are in the same direction at temperatures lower than the compensation temperature of the reproducing layer and in opposite directions at temperatures higher than the compensation temperature.

More specifically, when rare earth (RE)-iron family (TM) element alloys are used as the reproducing layer and the recording layer, the reproducing layer is a magnetic layer in which rare earth element sublattice magnetization is predominant (RE rich) at room temperature and has a compensation temperature between room temperature and a Curie temperature. In the recording layer of the medium (1) described above, iron family element sublattice magnetization is predominant (TM rich) at room temperature. In the recording layer of the medium (2), rare earth element sublattice magnetization is predominant (RE rich).

Note that this arrangement (1) or (2) needs to be accomplished at least within the temperature range in a light spot during reproduction. When rare earth (RE)-iron family (TM) element alloys are used as the reproducing layer and the recording layer, it is desirable that the reproducing layer be a magnetic layer in which rare earth element sublattice magnetization is predominant (RE rich) and the recording layer be predominant in iron family element sublattice magnetization (TM rich), since magnetized information can be recorded in the recording layer with a weak magnetic field.

To further improve the characteristics, of the medium it is preferable to additionally form a reflection layer. An interference layer made from a dielectric substance can also be formed between the recording layer and the reflection layer. When this interference layer is formed, heat is not easily released from the recording layer to the reflection layer, and as a consequence, an enhanced structure capable of low-power recording is obtained. One of the resulting merits of this structure is a high C/N ratio.

The reproducing layer is made from a material, e.g., a rare earth-iron family amorphous alloy, which maintains perpendicular magnetization from room temperature to the Curie temperature. More specifically, GdFeCo, TbFeCo, GdTbFeCo, GdDyFeCo, NdGdFeCo, and GdCo are desirable.

The recording layer is a layer in which binary information is stored and is preferably made from a material which has a large perpendicular magnetic anisotropy and can stably hold a magnetized state. Among all materials, rare earth-iron family amorphous alloys such as TbFeCo, DyFeCo, and TbDyFeCo are most desirable. It is also possible to use garnet; platinum group-iron family periodic structure films such as Pt/Co and Pd/Co films; and platinum group-iron family alloys such as PtCo and PdCo. By "iron family" is here meant the elements iron, cobalt, and nickel. By "platinum group" is here meant the elements Ru, Rh, Pd, Os, Ir and Pt.

If the reproducing layer and the recording layer have nearly equivalent complex refractive indices, the reproducing layer is preferably thinner than the recording layer in order that the rotation of the plane of polarization is canceled by the reproducing layer and the recording layer in the mask portion of a light spot, because the reproducing layer close to the incident surface has a large influence on the rotation of the plane of polarization.

Note that the reproducing layer and the recording layer can be added with elements such as Cr, Al, Ti, Pt, and Nb in order to improve the corrosion resistance of the medium.

The intermediate layer breaks the exchange coupling between the reproducing layer and the recording layer and magnetostatically couples these layers. Preferable materials of the intermediate layer are dielectric substances such as $SiN$, $AlN_x$, $AlO_x$, $TaO_x$, and $SiO_x$ (FIG. 2B). These dielectric substances can almost completely break an exchange coupling interaction with a thickness of 1 to 2 nm or more. Also, the influence of the exchanging force can be eliminated by the use of a magnetic layer with a strong longitudinal anisotropy. This intermediate layer so functions as to break the exchanging force in the entire region of a light spot. For this purpose, the film thickness is preferably 1 to 20 nm, and more preferably 4 to 15 nm.

In a high-temperature region of the light spot, the reproducing layer and the recording layer need to be thin enough to transmit light and cancel θk. The film thickness is at least 40 nm or less, preferably 30 nm or less, and more preferably 20 nm or less. However, light does not necessarily perfectly transmit through the recording layer. That is, it is only necessary that light penetrating into the recording layer to some extent be reflected and as a consequence that θk be canceled.

The recording/reproduction process of the present invention will be described below.

First, a recording magnetic domain is formed in accordance with a data signal in the recording layer of the magneto-optical recording medium of the present invention. Recording is performed by erasing recorded data and modulating the laser power while a magnetic field is applied in the recording direction. Alternatively, new data is overwritten on old data by modulating a laser power while an external magnetic field is applied. In these optical modulation recording methods, a recording magnetic domain smaller than the diameter of a light spot can be formed when the intensity of a laser beam is determined in consideration of the linear velocity of a recording medium so that the temperature only in a predetermined region of the light spot becomes close to the Curie temperature of the recording layer. Consequently, a signal of a period smaller than the diffraction limit of light can be recorded. Alternatively, overwrite recording is performed by modulating an external magnetic field while a laser beam, with a power by which the temperature of the recording layer becomes the Curie temperature or higher, irradiates the medium. If this is the case, a recording magnetic domain smaller than the diameter of the light spot can be formed by increasing the modulation rate in accordance with the linear velocity. As a result, a signal of a period smaller than the diffraction limit of light can be recorded.

The reproduction method of the magneto-optical recording medium of the present invention will be described below.

The media of the present invention are classified into two types as described earlier. The reproduction method of the present invention will be described below by taking as an example a medium (corresponding to the medium (1) described above) using a ferrimagnetic rare earth-iron family alloy with which the reproducing layer is predominant in a rare earth element at room temperature and has a compensation temperature between room temperature and the Curie temperature and the recording layer is predominant in an iron family element at room temperature.

Figure 3A:
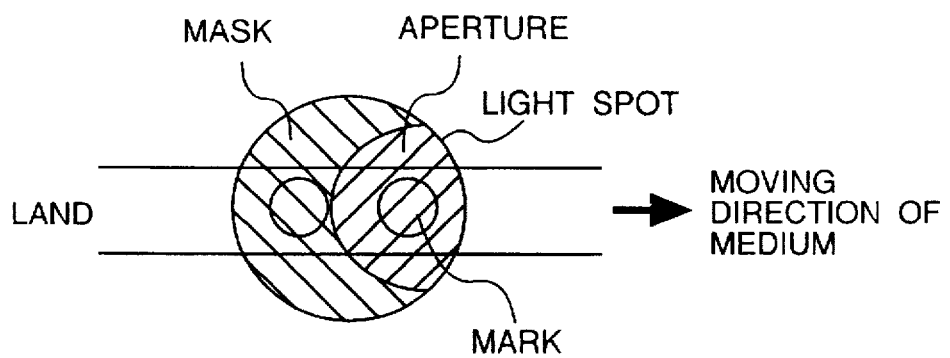
Figure 3B:
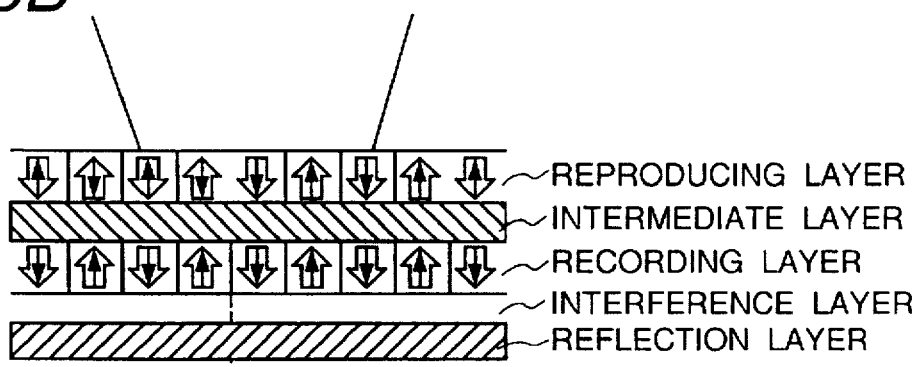
Figure 3C:
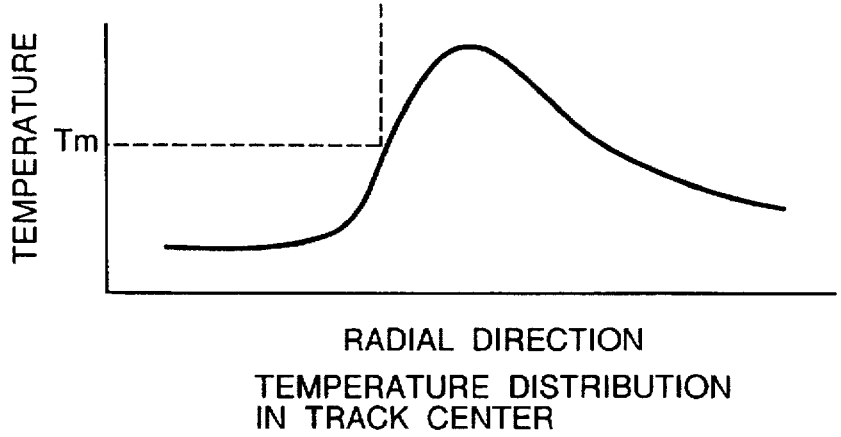

FIGS. 3A to 3C show the state of this medium during reproduction. FIG. 3B is a sectional view of the medium of the present invention, in which hollow arrows indicate overall magnetizations and black arrows indicate sublattice magnetizations of an iron family element.

In the following description, assume that the effective magnetic field generated from the recording layer to the reproducing layer by magnetostatic coupling is Hst, the coercive force of the reproducing layer is HcR, the ambient temperature is Ta, the mask temperature (at which a mask is started to be formed) is Tm, the maximum temperature is Tmax, and the medium temperature is T.

In this medium, the reproducing layer couples with the recording layer by a magnetostatic coupling force. In order for this to occur, condition (I) below need only be satisfied:

$$HcR < Hst \qquad (I)$$

In a portion (T<Tm) at a low temperature including room temperature, the reproducing layer is an RE-rich film because the layer is at a temperature lower than the compensation temperature. On the other hand, the recording layer is a TM-rich film at any instant at least in a light spot during reproduction. In the low-temperature portion (T<Tm), therefore, overall magnetizations in the reproducing layer and the recording layer are oriented in the same direction by magnetostatic coupling, and so TM sublattice magnetizations having the largest influence on a Kerr rotational angle are oriented in opposite directions in these two layers. Consequently, the plane of polarization of light transmitted through the substrate is rotated in the reproducing layer and then rotated in the opposite direction in the recording layer, and the light returns to a magneto-optical recording apparatus. Therefore, if the rotational angle of the polarization plane of light polarized by the reproducing layer is equal to the rotational angle of the polarization plane of light polarized by the recording layer, the Kerr rotational angle is not influenced by these layers. That is, even when the incident light is transmitted through the reproducing layer, magnetized information in the magnetic layer is not detected.

In a high-temperature portion (T>Tm), the reproducing layer is at a temperature higher than the compensation temperature and becomes the same TM-rich film as the recording layer. Consequently, the reproducing layer reverses its magnetization, i.e., the sublattice magnetization in the reproducing layer is oriented in the same direction as the sublattice magnetization in the recording layer. This enables reproduction of the magnetized information recorded in the recording layer. This magnetization reversal essentially occurs at a temperature slightly higher than the compensation temperature, since at temperatures around the compensation temperature the coercive force of the reproducing layer is large and the magnetization in the reproducing layer is small.

The magnetostatic coupling Hst described above is roughly directly proportional to the saturation magnetization in the recording layer and inversely proportional to the film thickness of the intermediate layer. Accordingly, to reliably reverse the magnetization in the reproducing layer in a high-temperature region, it is preferable to increase the saturation magnetization in the recording layer in the high-temperature region of a light spot and to decrease the film thickness of the intermediate layer in the high-temperature region sufficiently to break the exchanging force. If the radius of a recording domain (recording mark) is larger than the film thickness of the recording layer, the magnetostatic field becomes weak and functions only around the recording domain. Therefore, it is effective to decrease the radius of the recording mark to be smaller than the film thickness.

Consequently, as illustrated in FIG. 3A, an aperture portion in which the recording mark is detected and a mask portion in which the recording mark is not detected appear in the light spot. Since this means that the effective diameter of the light spot is decreased, it becomes possible to detect a recording mark much smaller than the light spot which cannot be detected by conventional methods.

Note that this detection is done by detecting the reflected light of the light spot.

When the reproducing layer passes by the high-temperature region and the temperature of this layer becomes lower than the compensation temperature, the direction of the TM sublattice magnetization in the reproducing layer again becomes opposite to the direction of the TM sublattice magnetization in the recording layer. This makes super-resolution reproduction possible when reproduction is again performed. FIG. 3C shows the temperature distribution of the medium in which the center of the light spot is shifted from the maximum-temperature portion in the temperature distribution along the moving direction of the medium. However, these portions can be the same and so reproduction can be done only in the center of the light spot. In the magneto-optical recording medium of the present invention, it is unnecessary to mask the magnetized information in the recording layer by using the reproducing layer and the layer having the same TM sublattice magnetic moment as the reproducing layer. Accordingly, these layers can be thinned to the extent to which reproduced signals are not deteriorated.

As a consequence, the film thickness of each magnetic layer can be made much smaller than conventional film thicknesses.

The medium of the present invention having the arrangement (2) described previously is identical with the medium (1) except that the recording layer is a magnetic layer in which the direction of TM sublattice magnetization which predominates exchange coupling is opposite to the direction of overall magnetization.

In the medium (2), therefore, in the low-temperature portion (T<Tm), the direction of the TM sublattice magnetization in the reproducing layer is the same as the direction of the TM sublattice magnetization in the recording layer. In the high-temperature portion (T>Tm), the direction of the TM sublattice magnetization in the reproducing layer is opposite to the direction of the TM sublattice magnetization in the recording layer.

Figure 4A:
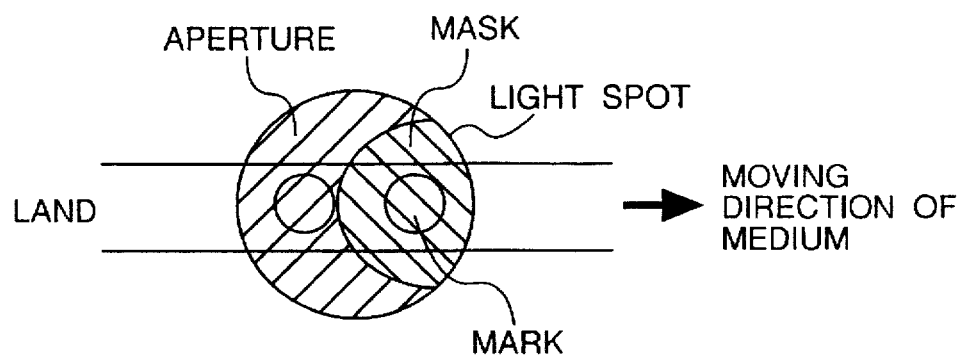
Figure 4B:
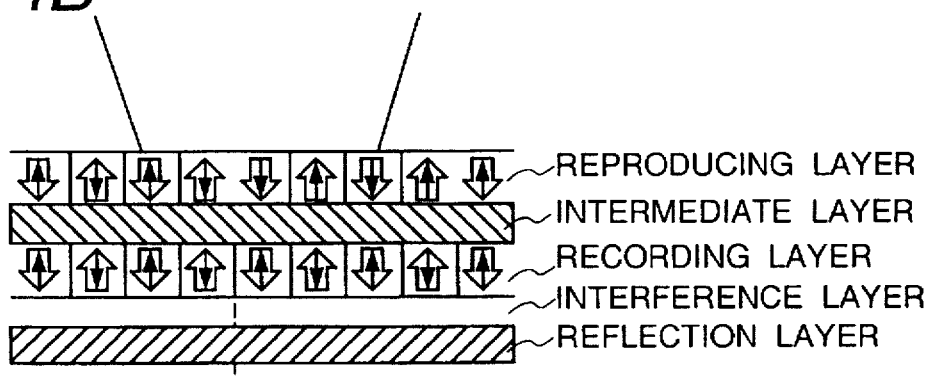
Figure 4C:
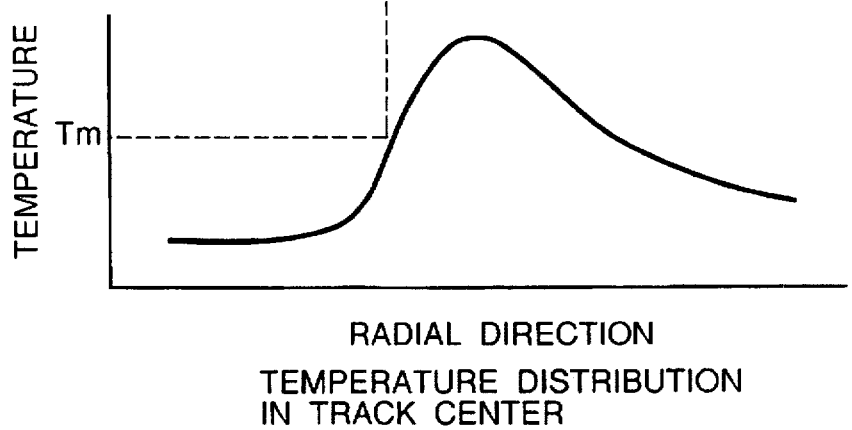

Accordingly, as shown in FIGS. 4A to 4C which illustrate reproduction using the medium (2), an aperture portion in which a recording mark is detected and a mask portion in which no recording mark is detected appear in a light spot, as shown in FIG. 4A, as in the case of the medium (1). Since the aperture region appears in the low-temperature region, this means that the effective diameter of the light spot is decreased. Consequently, it becomes possible to detect a recording mark much smaller than the light spot, which cannot be detected by conventional methods.

In the magneto-optical recording medium of the present invention, it is unnecessary to mask the magnetized information in the recording layer by using the reproducing layer and the layer having the same TM sublattice magnetic moment as the reproducing layer. Accordingly, these layers can be thinned to the extent to which reproduced signals do not deteriorate.

As a consequence, the film thickness of each magnetic layer can be made much smaller than conventional film thicknesses.

In the medium (1), a narrow high-temperature region is the aperture region. Therefore, information on adjacent tracks can also be isolated and masked. Consequently, it is possible to simultaneously increase the linear velocity and the track density.

A reflection layer can also be formed on the side away from the incident surface of the recording layer. When incident light transmitted through the recording layer, this reflection layer reflects the light and prevents a decrease in the quantity returning light. The reflection layer also enhances the incident light between the magnetic layer and the reflection layer. In addition to the reflection layer, a dielectric substance, such as SiN, $AlN_x$, $AlO_x$, $TaO_x$, or $SiO_x$, can be formed as an interference layer in order to enhance the interference effect. This interference layer must have a film thickness by which θk in the recording layer can be canceled and a desired reflectance can be obtained. It is also possible to form a thermal conduction layer for increasing the thermal conductivity in order to improve the domain shape when field modulation overwrite is performed. Al, AlTa, AlTi, AlCr, and Cu can be used as the reflection layer and thermal conduction layer. The reflection layer must be thinned enough to sufficiently reflect light. Also, the reflection layer and the thermal conduction layer must be thinned to the extent to which the optical power is not too high. It is also possible to make a single layer function as both thermal conduction and reflection layers. Furthermore, the dielectric layer described above or a protective coat made from a polymeric resin can be formed as a protective film.

The present invention will be described in more detail below by way of its experimental examples. However, the present invention is not limited to these experimental examples as long as the invention does not depart from the gist of the invention.

(Experimental Example 1)

SiN, Tb, Gd, Fe, Co, and Al targets were attached to a DC magnetron sputtering apparatus, and an 80-nm thick SiN dielectric layer, a 10-nm thick GdFeCo reproducing layer, a 5-nm thick SiN intermediate layer, a 15-nm thick TbFeCo recording layer, a 30-nm thick SiN interference layer, and a 60-nm thick Al reflection layer were sequentially formed on a pre-grooved polycarbonate substrate 130 mm in diameter, thereby obtaining a magneto-optical recording medium of the present invention having the arrangement shown in FIG. 2C. The composition of the GdFeCo reproducing layer was so set that the layer was RE rich at room temperature, the compensation temperature was 130° C., and the Curie temperature was 300° C. or higher.

The composition of the TbFeCo recording layer was so set that the layer was TM rich at room temperature and the Curie temperature was 220° C.

While this magneto-optical recording medium was rotated at a rotation speed of 2,600 rpm, a 12.5-MHz RF signal was written in the position of a radius of 37 mm so that the recording mark length was 0.40 µm, and a 6.4-MHz RF signal was written in the same position so that the recording mark length was 0.78 µm. The linear velocity of the medium at that time was 10 m/s. Thereafter, C/N ratios at the individual mark lengths were measured. The NA of an objective lens of an optical head was 0.55 and the laser wavelength was 780 nm.

Subsequently, while the linear velocity was changed, step by step, to 5 m/s (rotation speed 1,300 rpm, radius 37 mm), 10 m/s (rotation speed 2,400 rpm, radius 40 mm), 15 m/s (rotation speed 3,600 rpm, radius 40 mm), 20 m/s (rotation speed 3,600 rpm, radius 54 mm), and 25 m/s (rotation speed 3,980 rpm, radius 60 mm), 3.2-, 9.6-, and 12.8-MHz signals were recorded so that the mark length was 0.78 µm, and a minimum recording power Pw at which the C/N ratio was 48 dB was obtained. The reproducing power was set at a value (2.0 to 2.5 mW) at which the C/N ratio was a maximum at each recording power.

The results are shown in Table 1 to be presented later.

(Experimental Example 2)

By using the same film formation apparatus and the same film formation method as in Experimental Example 1, an 80-nm thick SiN dielectric layer, a 12-nm thick GdFeCo reproducing layer, a 6-nm SiN intermediate layer, a 10-nm thick TbFeCo recording layer, a 30-nm thick SiN interference layer, and a 60-nm thick Al reflection layer were sequentially formed on a polycarbonate substrate, thereby obtaining a magneto-optical recording medium of the present invention having the arrangement shown in FIG. 2B.

The composition of the GdFeCo reproducing layer was so set that the layer was RE rich at room temperature, the compensation temperature was 150° C., and the Curie temperature was 300° C. or higher.

The composition of the TbFeCo recording layer was so set that the layer was TM rich at room temperature and the Curie temperature was 250° C.

Following the same procedures as in Experimental Example 1, the recording and reproduction characteristics of this magneto-optical recording medium were measured. The measurement results are shown in Table 1.

(Experimental Example 3)

By using the same film formation apparatus and the same film formation method as in Experimental Example 1, an 80-nm thick SiN dielectric layer, a 12-nm thick GdFeCo reproducing layer, a 5-nm SiN intermediate layer, a 10-nm thick DyFeCo recording layer, a 30-nm thick SiN interference layer, and a 60-nm thick Al reflection layer were sequentially formed on a polycarbonate substrate, thereby obtaining a magneto-optical recording medium of the present invention having the arrangement shown in FIG. 2B.

The composition of the GdFeCo reproducing layer was so set that the layer was RE rich at room temperature, the compensation temperature was 180° C., and the Curie temperature was 300° C. or higher.

The composition of the DyFeCo recording layer was so set that the layer was TM rich at room temperature and the Curie temperature was 230° C.

Following the same procedures as in Experimental Example 1, the recording and reproduction characteristics of this magneto-optical recording medium were measured. The measurement results are shown in Table 1.

(Comparative Example 1)

By using the same film formation apparatus and the same film formation method as in Experimental Example 1, an 80-nm thick SiN dielectric layer, an 80-nm thick TbFeCo recording layer, and a 70-nm thick SiN protective layer were sequentially formed on a polycarbonate substrate, thereby obtaining a conventional non-super-resolution magneto-optical recording medium. The refractive index of each SiN layer was 2.1.

The composition of the TbFeCo recording layer was so set that the layer was TM rich at room temperature and the Curie temperature was 250° C.

Following the same procedures as in Experimental Example 1, the recording and reproduction characteristics of this magneto-optical recording medium were measured. The measurement results are shown in Table 1.

No super-resolution effect was obtained by this conventional medium.

(Comparative Example 2)

By using the same film formation apparatus and the same film formation method as in Experimental Example 1, an 80-nm thick SiN dielectric layer, a 30-nm thick GdFeCo reproducing layer, a 10-nm thick TbFeCo intermediate layer, a 40-nm thick TbFeCo recording layer, and a 70-nm thick SiN protective layer were sequentially formed on a polycarbonate substrate, thereby obtaining a conventional super-resolution magneto-optical recording medium. The refractive index of each SiN layer was 2.1.

The composition of the GdFeCo reproducing layer was so set that the layer was TM rich at room temperature and the Curie temperature was 300° C. or higher.

The composition of the TbFeCo intermediate layer was so set that the layer was TM rich at room temperature and the Curie temperature was 140° C.

The composition of the TbFeCo recording layer was so set that the layer was TM rich at room temperature and the Curie temperature was 250° C.

Following the same procedures as in Experimental Example 1, the recording and reproduction characteristics of this magneto-optical recording medium were measured. Note that only in this Comparative Example 2, a reproduction magnetic field of 500 Oe was applied during reproduction. The measurement results are shown in Table 1.

Comparing the results of Comparative Examples 1 and 2 with the results of Experimental Examples 1 to 3 shows that super-resolution recording/reproduction, in which the C/N ratio was 45 dB or higher with a mark length of 0.4 µm, was possible in the magneto-optical recording media of the present invention even if the film thicknesses of the magnetic layers were small. Also, the laser power necessary for recording was much lower than that in the comparative examples even at a high linear velocity. The maximum output on the surface of a medium of a semiconductor laser used in present magneto-optical recording apparatuses is approximately 10 mW. Accordingly, while the possible linear velocity was a maximum of 17 m/s by the conventional magneto-optical recording media in the comparative examples, it was possible to increase the linear velocity to about 25 m/s in the experimental examples of the present invention. This indicates that when the output of the semiconductor laser is further increased, the difference between the present invention and the conventional technologies tends to increase more and more. This demonstrates that the magneto-optical recording media of the present invention can achieve high-speed recording compared to the conventional media.

TABLE 1

| Items | C/N (dB) | C/N (dB) | Pw(mW) | Pw (mW) | Pw (mW) | Pw (mW) | Pw (mW) |
|---|---|---|---|---|---|---|---|
| Mark length (µm) | 0.78 | 0.40 | 0.78 | 0.78 | 0.78 | 0.78 | 0.78 |
| Linear velocity (m/s) | 10 | 10 | 5 | 10 | 15 | 20 | 25 |
| Experimental Example 1 | 48 | 45 | 5.4 | 7.0 | 8.2 | 9.3 | 10.1 |
| Experimental Example 2 | 49 | 45 | 5.5 | 6.7 | 8.3 | 9.2 | 9.4 |
| Experimental Example 3 | 50 | 45 | 5.7 | 6.8 | 7.9 | 8.9 | 9.5 |
| Comparative Example 1 | 49 | 30 | 6.0 | 8.0 | 10.0 | 12.0 | 14.0 |
| Comparative Example 2 | 48 | 45 | 6.0 | 8.1 | 10.2 | 12.2 | 14.0 |

[Second Embodiment]

A magneto-optical recording medium and a recording/reproduction method using the medium according to the second embodiment of the present invention will be described below with reference to the accompanying drawings.

In the following description, first, second, and third magnetic layers will be referred to as reproducing, recording, and intermediate layers, respectively.

Figure 5A:
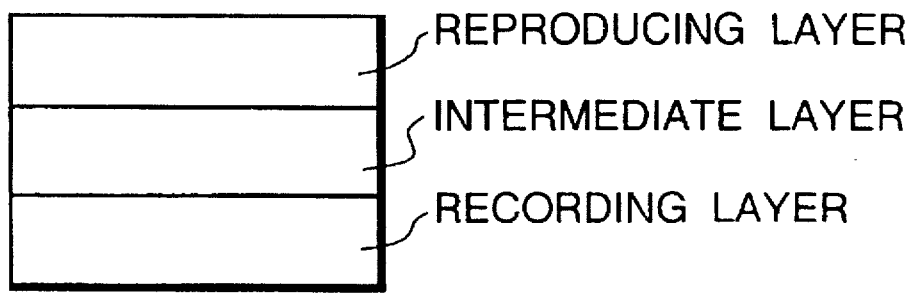

As illustrated in FIG. 5A, this magneto-optical recording medium of the present invention is manufactured by stacking at least a reproducing layer, an intermediate layer, and a recording layer in this order from the light incident side. To further improve the characteristics of the medium, it is preferable to additionally form a reflection layer. An interference layer made from a dielectric substance can also be formed between the recording layer and the reflection layer. When this interference layer is formed, heat is not easily released from the recording layer to the reflection layer, and as a consequence, an enhanced structure capable of low-power recording is obtained. One of the resulting merits is a high C/N ratio.

The reproducing layer is made from a material, e.g., a rare earth-iron family amorphous alloy, which maintains perpendicular magnetization from room temperature to the Curie temperature. More specifically, GdFeCo, TbFeCo, GdTbFeCo, GdDyFeCo, NdGdFeCo, and GdCo are desirable.

The intermediate layer is positioned between the reproducing layer and is the recording layer and made from a material which reversibly makes a transition in its magnetic phase, i.e., which shows anti-ferromagnetism at room temperature, makes the transition from anti-ferromagnetism to ferromagnetism when the temperature is raised, and returns to anti-ferromagnetism when the temperature is returned to room temperature. Note that the temperature at which the material makes the transition from anti-ferromagnetism to ferromagnetism (this temperature is at least higher than room temperature and lower than the Curie temperatures of the recording layer and the reproducing layer) do not necessarily agree with the temperature at which the material makes the transition from ferromagnetism to anti-ferromagnetism. In a low-temperature region of a light spot, the intermediate layer is anti-ferromagnetic and breaks the exchanging force from the recording layer to the reproducing layer. In a high-temperature region, the intermediate layer is ferromagnetic and mediates the exchange coupling force. This is the principal function of the intermediate layer.

The intermediate layer is preferably a magnetic film primarily containing FeRh, MnSb, MnCrSb, HfTaFe, or MnPt. Of these materials, FeRh is the most desirable because a magnetic film having a magnetic phase transition temperature higher than room temperature can be easily obtained. It is also possible to add elements such as Pd, Pt, and Ir to FeRh in order to, e.g., adjust the magnetic phase transition temperature. If the film thickness of the intermediate layer is too small, the layer is unsatisfactory to break the exchanging force from the recording layer at room temperature. If the film thickness is too large, the laser power necessary for recording is increased. Therefore, the film thickness of the intermediate layer is preferably 1 to 15 nm, and more preferably 4 to 10 nm. In addition to meeting the above conditions, the temperature at which the intermediate layer makes the transition from anti-ferromagnetism to ferromagnetism must exist between the maximum temperature in a light spot during reproduction and room temperature. More specifically, the temperature ranges between 80° C. and 250° C., and preferably 120° C. and 200° C.

In the high-temperature region, the reproducing layer, the intermediate layer, and the recording layer need to be thinned enough to transmit light and cancel θk. The film thickness is at least 30 nm or less, preferably 20 nm or less, and more preferably 15 nm or less.

The recording layer is preferably made from a material which has a large perpendicular magnetic anisotropy and can stably hold a magnetized state. Among all materials, rare earth-iron family amorphous alloys such as TbFeCo, DyFeCo, and TbDyFeCo are most desirable. It is also possible to use garnet; platinum group-iron family periodic structure films such as Pt/Co and Pd/Co films; and platinum group-iron family alloys such as PtCo and PdCo.

If the reproducing layer and the recording layer have nearly equivalent complex refractive indices, the reproducing layer is preferably thinner than the recording layer in order that the rotation of the plane of polarization is canceled by the reproducing layer and the recording layer in the high-temperature region, because the reproducing layer close to the incident surface has a large influence on the rotation of the plane of polarization.

Note that the reproducing layer, the intermediate layer, and the recording layer can be added with elements such as Cr, Al, Ti, Pt, and Nb in order to improve corrosion resistance.

The recording/reproduction process of the present invention will be described below.

First, a recording magnetic domain is formed in accordance with a data signal in the recording layer of the magneto-optical recording medium of the present invention. Recording is performed by erasing recorded data and modulating a laser power while a magnetic field is applied in the recording direction. Alternatively, new data is overwritten on old data by modulating the laser power while an external magnetic field is applied. In these optical modulation recording methods, a recording magnetic domain smaller than the diameter of a light spot can be formed when the intensity of a laser beam is determined in consideration of the linear velocity of a recording medium so that the temperature only in a predetermined region of the light spot becomes close to the Curie temperature of the recording layer. Consequently, a signal of a period smaller than the diffraction limit of light can be recorded. Alternatively, overwrite recording is performed by modulating an external magnetic field, while a laser beam, with a power by which the temperature of the recording layer becomes the Curie temperature or higher, irradiates the medium. If this is the case, a recording magnetic domain smaller than the diameter of the light spot can be formed by increasing the modulation rate in accordance with the linear velocity. As a result, a signal of a period smaller than the diffraction limit of light can be recorded.

The reproduction method of the magneto-optical recording medium of the present invention will be described below.

The intermediate layer of this medium is made from a magnetic phase transition material. The intermediate layer shows anti-ferromagnetism at low temperatures including room temperature and makes the transition to ferromagnetism at high temperatures. The transition temperature is set within the temperature range in a light spot during reproduction. Since the intermediate layer is anti-ferromagnetic at any instant at temperatures from room temperature to the magnetic phase transition temperature, equal numbers of spins in opposite directions exist. Accordingly, the exchange coupling force between the reproducing layer and the recording layer is effectively broken. As a consequence, the reproducing layer and the recording layer magnetostatically couple with each other in a low-temperature region of a light spot during reproduction and exchange-couple with each other via the intermediate layer in a high-temperature region because the intermediate layer is ferromagnetic in this region. Note that at temperatures below the transition temperature, equal numbers of sublattice magnetizations in opposite directions exist in the intermediate layer and the overall magnetization of the layer is 0. In FIG. 6B, this state is indicated by blanks (hatched portions).

The reproducing layer and the recording layer are ferrimagnetic and different in the type of predominant sublattice magnetization (this is generally called an antiparallel structure). More specifically, when rare earth (RE)-iron family (TM) element alloys are used in the reproducing layer and the recording layer, the reproducing layer is a magnetic layer in which rare earth element sublattice magnetization is predominant (RE rich), and the recording layer is predominant in iron family element sublattice magnetization (TM rich) at room temperature, or vice versa. When rare earth (RE)-iron family (TM) element alloys are used in the reproducing layer and the recording layer, it is desirable that the reproducing layer be a magnetic layer in which rare earth element sublattice magnetization is predominant (RE rich) and the recording layer be predominant in iron family sublattice magnetization (TM rich) at room temperature, because magnetized information can be recorded in the recording layer with a low magnetic field. Note that this antiparallel structure needs to be achieved at least within the temperature range in a light spot during reproduction.

When information is reproduced from the magneto-optical recording medium of the present invention, therefore, in a low-temperature region of a light spot, the reproducing layer and the recording layer magnetostatically couple with each other, with the result that overall magnetizations are aligned in the same direction and sublattice magnetizations are aligned in opposite directions. In a high-temperature region, the reproducing layer and the recording layer exchange-couple with each other, and sublattice magnetizations are aligned in the same direction.

This state is shown in FIG. 6B. Referring to FIG. 6B, hollow arrows indicate the directions of overall magnetizations and black arrows indicate the directions of sublattice magnetizations. That is, if, for example, a ferrimagnetic rare earth-iron family transition metal alloy which is predominant in rare earth element is used in the reproducing layer and a ferrimagnetic rare earth-iron family transition metal alloy which is predominant in iron family transition metal is used in the recording layer, the hollow arrows indicate the overall magnetizations and the black arrows indicate the sublattice magnetizations of the iron family transition metal.

In the low-temperature portion, TM sublattice magnetic moments are oriented in opposite directions in the reproducing layer and the recording layer. Consequently, the plane of polarization of light transmitting through the substrate is rotated in the reproducing layer and then rotated in the opposite direction in the recording layer, and the light returns to a magneto-optical recording apparatus. Therefore, if the rotational angle of the polarization plane of light polarized by the reproducing layer is equal to the rotational angle of the polarization plane of light polarized by the recording layer, the Kerr rotational angle is not influenced by these layers. That is, even when the incident light is transmitted through the reproducing layer, magnetized information in the magnetic layer is not detected. Accordingly, no signal is detected at a temperature lower than the mask temperature Tm.

Figure 6A:
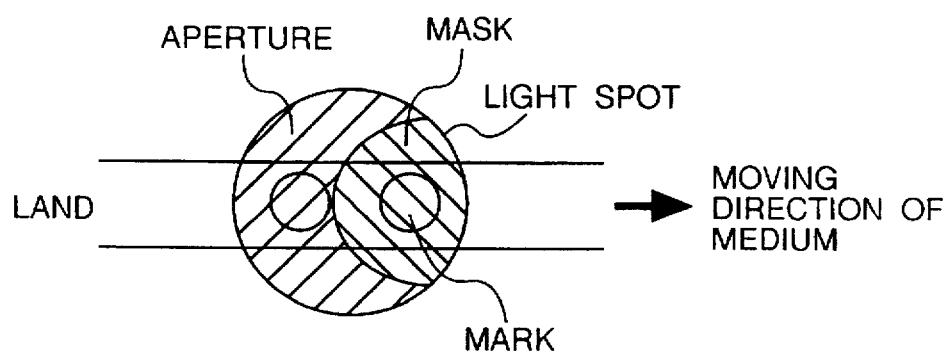
Figure 6B:
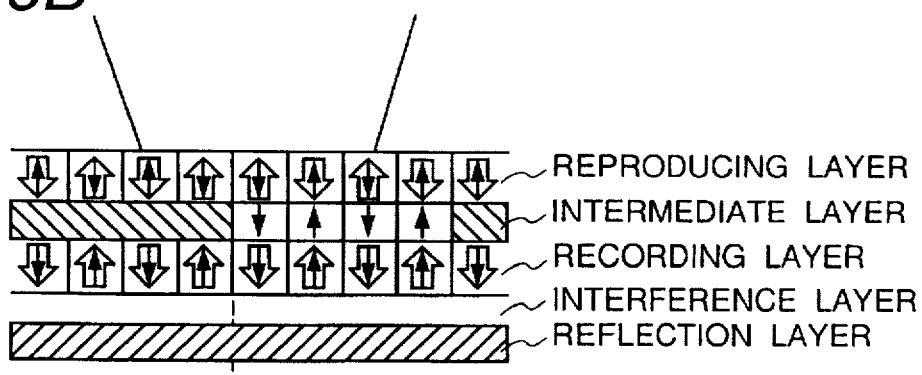
Figure 6C:
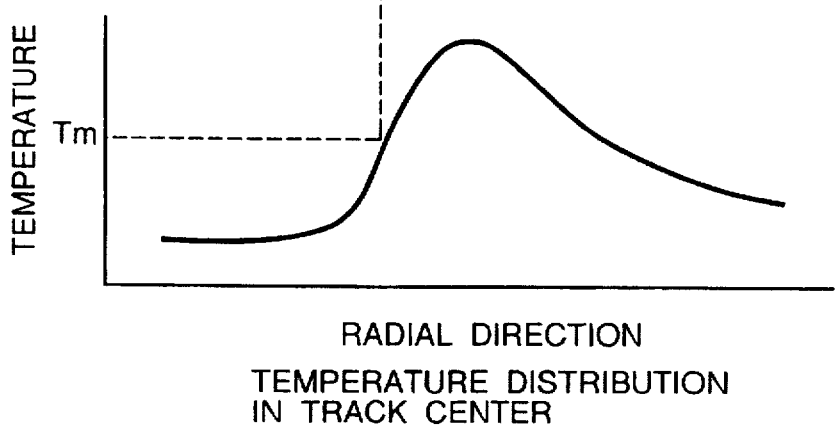

Consequently, as illustrated in FIG. 6A, an aperture portion in which the recording mark is detected and a mask portion in which the recording mark is not detected appear in the light spot. Since this means that the effective diameter of the light spot is decreased, it becomes possible to detect a recording mark much smaller than the light spot which cannot be detected by conventional methods.

In the medium of the present invention, a narrow high-temperature region is the aperture region. Therefore, information on adjacent tracks can also be isolated and masked. Consequently, it is possible to simultaneously increase the linear velocity and the track density.

In the magneto-optical recording medium of the present invention, it is unnecessary to mask the magnetized information in the recording layer by using the reproducing layer and the layer having the same TM sublattice magnetic moment as the reproducing layer. Accordingly, these layers can be thinned to the extent to which reproduced signals do not deteriorate. As a consequence, the film thickness of each magnetic layer can be made much smaller than conventional film thicknesses.

The magnetostatic coupling is roughly directly proportional to the saturation magnetization in the recording layer and inversely proportional to the film thickness of the intermediate layer. Accordingly, to reliably reverse the magnetization in the reproducing layer in a low-temperature region, it is preferable to increase the saturation magnetization in the recording layer in the low-temperature region of a light spot and to decrease the film thickness of the intermediate layer in the low-temperature region to the limit to which the effect of the intermediate layer can be achieved. If the radius of a recording domain (recording mark) is larger than the film thickness of the recording layer, a magnetostatic field becomes weak and functions only around the recording domain. Therefore, it is effective to decrease the radius of the recording mark to be smaller than the film thickness.

A reflection layer can also be formed on the side away from the incident surface of the recording layer. When incident light is transmitted through the recording layer, this reflection layer reflects the light and prevents a decrease in the returning quantity of light. The reflection layer also enhances the incident light between the magnetic layer and the reflection layer. In addition to the reflection layer, a dielectric substance such as SiN, $AlN_x$, $AlO_x$, $TaO_x$, or $SiO_x$ can be formed as an interference layer in order to enhance the interference effect. This interference layer must have a film thickness by which θk in the recording layer can be canceled and a desired reflectance can be obtained. It is also possible to form a thermal conduction layer for increasing the thermal conductivity in order to improve the domain shape when field modulation overwrite is performed. Al, AlTa, AlTi, AlCr, and Cu can be used as these reflection layer and thermal conduction layer. The reflection layer must be thinned enough to reflect light. Also, the reflection layer and the thermal conduction layer must be thinned to the extent to which the optical power is not too high. It is also possible to make a single layer function as both thermal conduction and reflection layers. Furthermore, the dielectric layer described above or a protective coat made from a polymeric resin can be formed as a protective film.

The present invention will be described in more detail below by way of its experimental examples. However, the present invention is not limited to these experimental examples as long as the invention does not depart from the gist of the invention.

(Experimental Example 4)

To check the magnetic characteristics of FeRh, a film of FeRh was formed on a glass substrate by using a DC magnetron sputtering apparatus. The composition of FeRh was controlled to have an atomic ratio of Fe:Rh=47:53 by controlling the powers of Fe and Rh targets. The film thickness was 1000 Å. After the FeRh film was formed, an 800-Å thick SiN film was formed as a protective film.

Magnetizations of this FeRh sample were measured by applying an external magnetic field by using a vibrating sample magnetometer. During the measurement, the sample was heated from room temperature to 500° C. while the pressure was reduced to $1 \times 10^{-3}$ Pa by using a rotary pump. This FeRh sample brought about a reversible magnetic phase transition from anti-ferromagnetism to ferromagnetism. Magnetization abruptly occurred at about 130° C. when the temperature was elevated, and the transition temperature was almost the same when the temperature was lowered. When Ir was added to FeRh in an amount of 5 to 10% with respect to Rh, the transition temperature became higher by approximately 170° C. to 280° C. than the transition temperature when Ir was not added. Also, when Pd was added in an amount of 2 to 6% with respect to Rh, the transition temperature became lower by approximately 50° C. to 150° C. than the transition temperature when Pd was not added. When the Rh composition of FeRh was varied within the range of 48 to 62%, the magnetic phase transition temperature rose as Rh increased. The range of the Rh composition in FeRh is appropriately 50 to 60% because magnetic phase transition occurs during reproduction.

A magneto-optical recording medium of the present invention was formed by using this FeRh as an intermediate layer. First, Si, Gd, Tb, Fe, Co, and Rh targets were attached to the DC magnetron sputtering apparatus, and a pre-grooved glass substrate 130 mm in diameter was fixed to a substrate holder arranged at a distance of 150 mm from the targets. Thereafter, the chamber was evacuated to a high vacuum of $1 \times 10^{-5}$ Pa or less by using a cryopump. While the chamber was evacuated, Ar gas was introduced into the chamber until 0.4 Pa was obtained, and an 80-nm thick SiN dielectric layer and a 10-nm thick GdFeCo reproducing layer were formed. A 5-nm thick FeRh intermediate layer was then formed on the substrate. Subsequently, a 15-mm thick TbFeCo recording layer, a 30-nm thick SiN interference layer, and a 60-nm thick Al reflection layer were sequentially formed to obtain a magneto-optical recording medium of the present invention having the arrangement shown in FIG. 5B. Each SiN dielectric layer was formed by reactive sputtering by introducing $N_2$ gas in addition to Ar gas and controlling the gas mixing ratio such that the refractive index was 2.2.

The composition of the GdFeCo reproducing layer was so set that the layer was RE rich at room temperature, the compensation temperature was higher than the Curie temperature, and the Curie temperature was 300° C. or higher. The magnetic phase transition temperature of the FeRh intermediate layer was approximately 160° C.

The composition of the TbFeCo recording layer was so set that the layer was TM rich at room temperature and the Curie temperature was 250° C.

While this magneto-optical recording medium was rotated at a rotation speed of 2,600 rpm, a 12.5-MHz RF signal was written in the position of a radius of 37 mm so that the recording mark length was 0.40 μm, and a 6.4-MHz RF signal was written in the same position so that the recording mark length was 0.78 μm. The linear velocity of the medium at that time was 10 m/s. Thereafter, C/N ratios at the individual mark lengths were measured. The NA of an objective lens of an optical head was 0.55 and the laser wavelength was 780 nm.

Subsequently, while the linear velocity was changed, step by step, to 5 m/s (rotation speed 1,300 rpm, radius 37 mm), 10 m/s (rotation speed 2,400 rpm, radius 40 mm), 15 m/s (rotation speed 3,600 rpm, radius 40 mm), 20 m/s (rotation speed 3,600 rpm, radius 54 mm), and 25 m/s (rotation speed 3,980 rpm, radius 60 mm), 3.2-, 9.6-, and 12.8-MHz signals were recorded so that the mark length was 0.78 μm, and a minimum recording power Pw at which the C/N ratio was 48 dB was obtained. The reproducing power was set at a value (2.0 to 2.5 mW) at which the C/N ratio was a maximum at each recording power.

The results are shown in Table 2 to be presented later.

(Experimental Example 5)

Figure 5B:
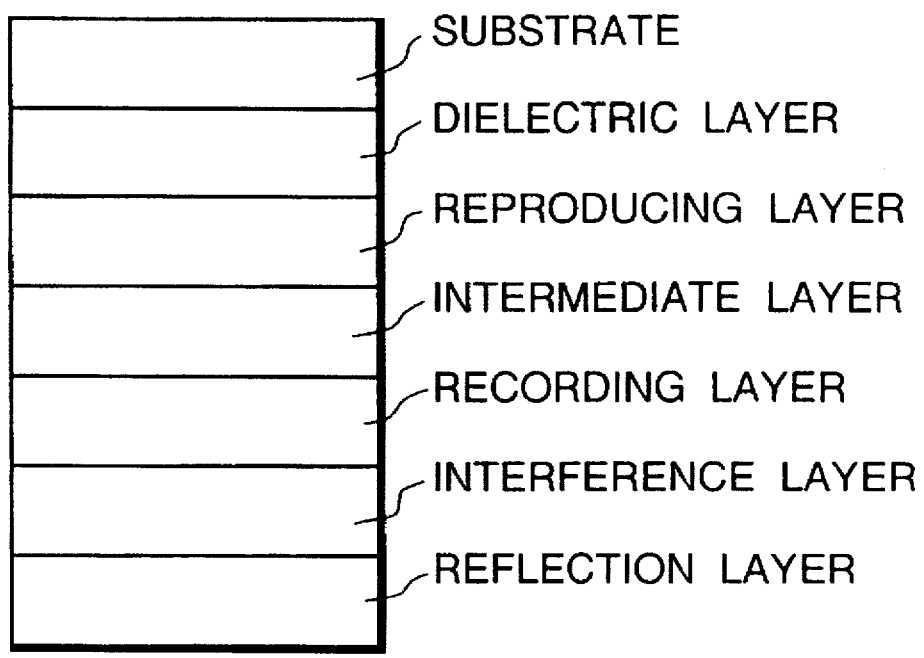

By using the same film formation apparatus and the same film formation method as in Experimental Example 4, an 80-nm thick SiN dielectric layer, a 12-nm thick GdFeCo reproducing layer, a 6-nm FeRhIr intermediate layer, a 10-nm thick TbFeCo recording layer, a 30-nm thick SiN interference layer, and a 60-nm thick Al reflection layer were sequentially formed on a polycarbonate substrate, thereby obtaining a magneto-optical recording medium of the present invention having the arrangement shown in FIG. 5B.

The composition of the GdFeCo reproducing layer was so set that the layer was TM rich at room temperature and the Curie temperature was 300° C. or higher.

The composition of the FeRh intermediate layer was $Fe_{47}(Rh_{95}Ir_5)_{53}$, and the magnetic phase transition temperature of the layer was about 150° C. The composition of the TbFeCo recording layer was so set that the layer was RE rich at room temperature, the compensation temperature was higher than the Curie temperature, and the Curie temperature was 250° C.

Following the same procedures as in Experimental Example 4, the recording and reproduction characteristics of this magneto-optical recording medium were measured. The measurement results are shown in Table 2.

(Experimental Example 6)

By using the same film formation apparatus and the same film formation method as in Experimental Example 4, an 80-nm thick SiN dielectric layer, a 10-nm thick GdFeCo reproducing layer, a 5-nm FeRh intermediate layer, a 12-nm thick DyFeCo recording layer, a 30-nm thick SiN interference layer, and a 60-nm thick Al reflection layer were sequentially formed on a polycarbonate substrate, thereby obtaining a magneto-optical recording medium of the present invention having the arrangement shown in FIG. 5B. The composition of the GdFeCo reproducing layer was so set that the layer was RE rich at room temperature, the compensation temperature was higher than the Curie temperature, and the Curie temperature was 300° C. or higher.

The magnetic phase transition temperature of the FeRh intermediate layer was about 140° C.

The composition of the DyFeCo recording layer was so set that the layer was TM rich at room temperature and the Curie temperature was 250° C.

Following the same procedures as in Experimental Example 4, the recording and reproduction characteristics of this magneto-optical recording medium were measured. The measurement results are shown in Table 2.

(Comparative Example 3)

By using the same film formation apparatus and the same film formation method as in Experimental Example 4, an 80-nm thick SiN dielectric layer, an 80-nm thick TbFeCo recording layer, and a 70-nm thick SiN protective layer were sequentially formed on a polycarbonate substrate, thereby obtaining a conventional non-super-resolution magneto-optical recording medium. The refractive index of each SiN layer was 2.1.

The composition of the TbFeCo recording layer was so set that the layer was TM rich at room temperature and the Curie temperature was 250° C.

Following the same procedures as in Experimental Example 4, the recording and reproduction characteristics of this magneto-optical recording medium were measured. The measurement results are shown in Table 2.

No super-resolution effect was obtained by this conventional medium.

(Comparative Example 4)

By using the same film formation apparatus and the same film formation method as in Experimental Example 4, an 80-nm thick SiN dielectric layer, a 30-nm thick GdFeCo reproducing layer, a 10-nm thick TbFeCo intermediate layer, a 40-nm thick TbFeCo recording layer, and a 70-nm thick SiN protective layer were sequentially formed on a polycarbonate substrate, thereby obtaining a conventional super-resolution magneto-optical recording medium. The refractive index of each SiN layer was 2.1.

The composition of the GdFeCo reproducing layer was so set that the layer was TM rich at room temperature and the Curie temperature was 300° C. or higher. The composition of the TbFeCo intermediate layer was so set that the layer was TM rich at room temperature and the Curie temperature was 140° C.

The composition of the TbFeCo recording layer was so set that the layer was TM rich at room temperature and the Curie temperature was 250° C.

Following the same procedures as in Experimental Example 4, the recording and reproduction characteristics of this magneto-optical recording medium were measured. Note that only in this Comparative Example 4, a reproduction magnetic field of 500 Oe was applied during reproduction. The measurement results are shown in Table 2.

Comparing the results of Comparative Examples 3 and 4 with the results of Experimental Examples 4 to 6 shows that super-resolution recording/reproduction, in which the C/N ratio was 45 dB or higher with a mark length of 0.4 μm, was possible in the magneto-optical recording media of the present invention even if the film thicknesses of the magnetic layers were small. Also, the laser power necessary for recording was much lower than that in the comparative examples even at a high linear velocity. The maximum output on the surface of a medium of a semiconductor laser used in present magneto-optical recording apparatuses is approximately 10 mW. Accordingly, while the possible linear velocity was a maximum of 17 m/s by the conventional magneto-optical recording media in the comparative examples, it was possible to increase the linear velocity to about 25 m/s in the experimental examples of the present invention. This indicates that when the output of the semiconductor laser is further increased, the difference between the present invention and the conventional technologies tends to increase more and more. This demonstrates that the magneto-optical recording media of the present invention can achieve high-speed recording compared to the conventional media.

Note that the above examples are explained by using a material which is anti-ferromagnetic at room temperature. However, the effect of the present invention can also be obtained by using a material which is ferromagnetic at room temperature and becomes anti-ferromagnetic when the temperature is elevated.

TABLE 2

| Items | C/N (dB) | C/N (dB) | Pw(mW) | Pw (mW) | Pw (mW) | Pw (mW) | Pw (mW) |
|---|---|---|---|---|---|---|---|
| Mark length (μm) | 0.78 | 0.40 | 0.78 | 0.78 | 0.78 | 0.78 | 0.78 |
| Linear velocity (m/s) | 10 | 10 | 5 | 10 | 15 | 20 | 25 |
| Experimental Example 4 | 48 | 45 | 5.3 | 6.8 | 8.0 | 9.1 | 10.0 |
| Experimental Example 5 | 49 | 45 | 5.8 | 6.5 | 8.5 | 9.0 | 9.2 |
| Experimental Example 6 | 49 | 45 | 5.9 | 6.9 | 8.5 | 8.9 | 9.3 |
| Comparative Example 3 | 49 | 30 | 6.0 | 8.0 | 10.0 | 12.0 | 14.0 |
| Comparative Example 4 | 48 | 45 | 6.0 | 8.1 | 10.2 | 12.2 | 14.0 |

[Third embodiment]

A magneto-optical recording medium and a recording/reproduction method using the medium according to the third embodiment of the present invention will be described in detail below with reference to the accompanying drawings.

In the following description, first, second, and third magnetic layers will be referred to as reproducing, recording, and intermediate layers, respectively.

Figure 7A:
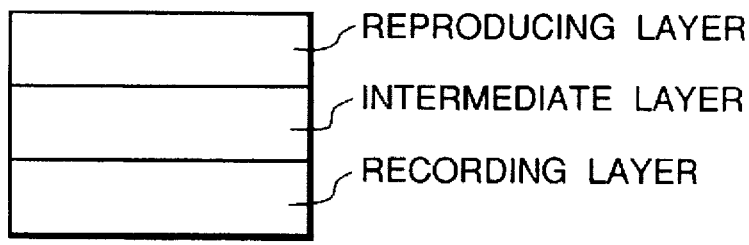

As illustrated in FIG. 7A, this magneto-optical recording medium of the present invention is manufactured by stacking at least a reproducing layer, an intermediate layer, and a recording layer in this order from the light incident surface on a substrate.

In an exchange-coupled state, overall magnetizations in the reproducing layer and the recording layer are antiparallel to each other, and the Curie temperature of the intermediate layer is lower than the Curie temperatures of the reproducing layer and the recording layer. At room temperature, sublattice magnetic moments of elements of the same kind in the reproducing layer and the recording layer are oriented in the same direction by exchange coupling. At least at the Curie temperature of the intermediate layer, the sublattice magnetic moments of elements of the same kind in the reproducing layer and the recording layer are oriented in opposite directions by magnetostatic coupling.

For this purpose, the reproducing layer and the recording layer are made ferrimagnetic so that they are different in the type of predominant sublattice magnetization (this is generally called an antiparallel structure). More specifically, when rare earth (RE)-iron family (TM) element alloys are used in the reproducing layer and the recording layer, the reproducing layer is a magnetic layer in which rare earth element sublattice magnetization is predominant (RE rich), and the recording layer is predominant in iron family element sublattice magnetization (TM rich) at room temperature, or vice versa. When rare earth (RE)-iron family (TM) element alloys are used in the reproducing layer and the recording layer, it is desirable that the reproducing layer be a magnetic layer in which rare earth element sublattice magnetization is predominant (RE rich) and the recording layer be predominant in iron family sublattice magnetization (TM rich) at room temperature, because magnetized information can be recorded in the recording layer with a weak magnetic field. Note that this antiparallel structure needs to be achieved at least within the temperature range in a light spot during reproduction.

Figure 7B:
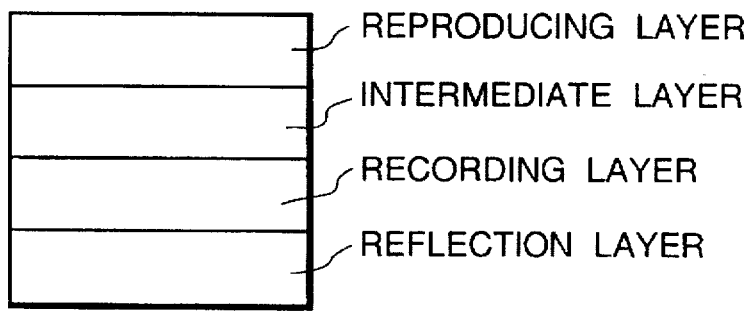

To further improve the characteristics, it is preferable to additionally form a reflection layer (FIG. 7B). An interference layer made from a dielectric substance can also be formed between the recording layer and the reflection layer. When this interference layer is formed, heat is not easily released from the recording layer to the reflection layer, and as a consequence, an enhanced structure capable of low-power recording is obtained. One of the resulting merits of this structure is a high C/N ratio.

The reproducing layer is made from a material, e.g., a rare earth-iron family amorphous alloy, which maintains perpendicular magnetization from room temperature to the Curie temperature. More specifically, GdFeCo, TbFeCo, GdTbFeCo, GdDyFeCo, NdGdFeCo, and GdCo are desirable.

The intermediate layer so functions as to mediate an exchange coupling force between the reproducing layer and the recording layer in a low-temperature region of a light spot and to break the exchanging force in a high-temperature region. For this purpose, the film thickness is preferably 1 nm or more, and more preferably 4 nm or more. If the intermediate layer is too thick, light does not well penetrate into the recording layer and so the effect of the present invention cannot be achieved. Therefore, the film thickness is preferably 20 nm or less, and more preferably 15 nm or less.

The recording layer is a layer in which binary information is stored and is preferably made from a material which has a large perpendicular magnetic anisotropy and can stably hold a magnetized state. Among all materials, rare earth-iron family amorphous alloys such as TbFeCo, DyFeCo, and TbDyFeCo are most desirable. It is also possible to use garnet; platinum group-iron family periodic structure films such as Pt/Co and Pd/Co films; and platinum group-iron family alloys such as PtCo and PdCo.

If the reproducing layer and the recording layer have nearly equivalent complex refractive indices, the reproducing layer is preferably thinner than the recording layer in order that the rotation of the plane of polarization is canceled by the reproducing layer and the recording layer in the mask portion of a light spot, because the reproducing layer close to the incident surface has a large influence on the rotation of the plane of polarization. Note that the reproducing layer, the intermediate layer, and the recording layer can be added with elements such as Cr, Al, Ti, Pt, and Nb in order to improve corrosion resistance.

In a high-temperature region of the light spot, the reproducing layer, the intermediate layer, and the recording layer need to be thinned enough to transmit light and cancel θk. The film thickness is at least 40 nm or less, preferably 30 nm or less, and more preferably 20 nm or less. However, light does not necessarily perfectly transmit through the recording layer. That is, it is only necessary that light penetrate into the recording layer to some extent be reflected and as a consequence θk be canceled.

The recording/reproduction process of the present invention will be described below.

First, a recording magnetic domain is formed in accordance with a data signal in the recording layer of the magneto-optical recording medium of the present invention. Recording is performed by erasing recorded data and modulating the laser power while a magnetic field is applied in the recording direction. Alternatively, new data is overwritten on old data by modulating the laser power while an external magnetic field is applied. In these optical modulation recording methods, a recording magnetic domain smaller than the diameter of a light spot can be formed when the intensity of a laser beam is determined in consideration of the linear velocity of a recording medium so that the temperature only in a predetermined region of the light spot becomes close to the Curie temperature of the recording layer. Consequently, a signal of a period smaller than the diffraction limit of light can be recorded. Alternatively, overwrite recording is performed by modulating an external magnetic field while a laser beam with a power, by which the temperature of the recording layer becomes the Curie temperature or higher irradiates the medium. If this is the case, a recording magnetic domain smaller than the diameter of the light spot can be formed by increasing the modulation speed in accordance with the linear velocity. As a result, a signal of a period smaller than the diffraction limit of light can be recorded.

Figure 8A:
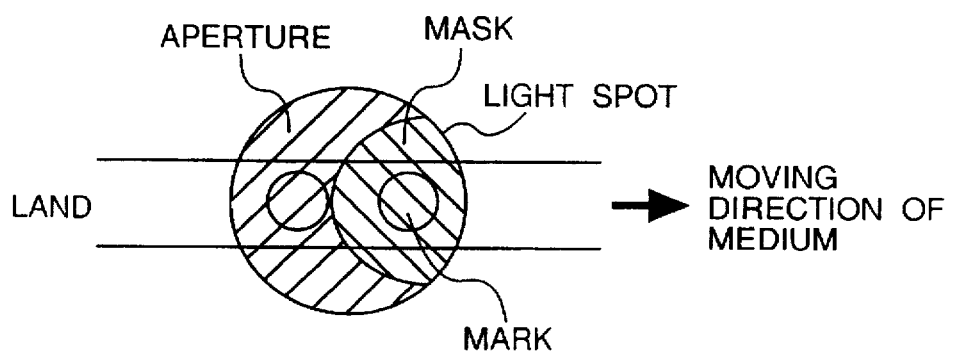
Figure 8B:
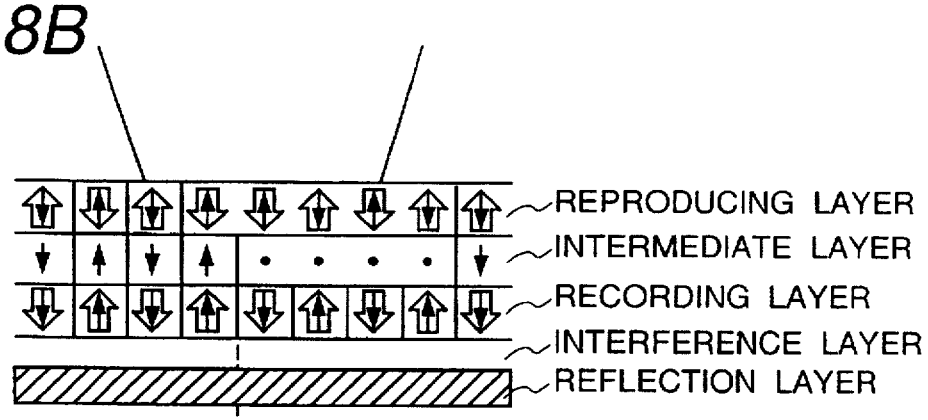
Figure 8C:
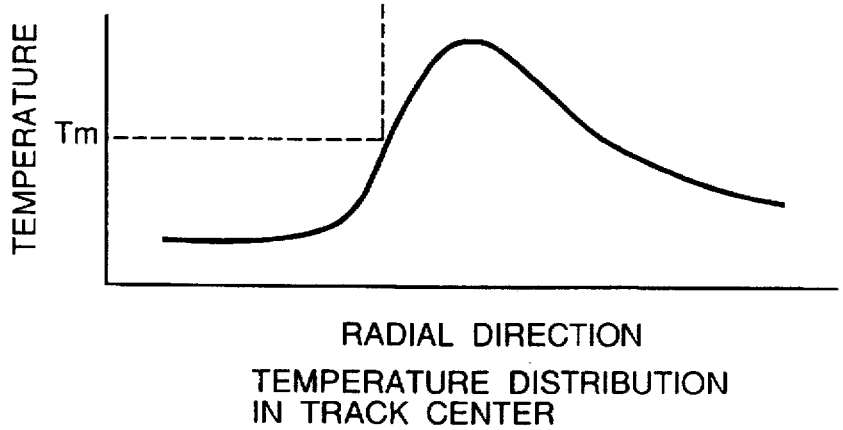

The method of reproducing the recorded data will be described below. FIGS. 8A to 8C are views showing this reproduction method. FIG. 8A shows an aperture and a mask in a light spot. FIG. 8B shows the film arrangement and the magnetized state during reproduction of the magneto-optical recording medium of the present invention. FIG. 8C shows the temperature distribution of the medium during reproduction.

In the following description, assume that the effective magnetic field applied on the reproducing layer by exchange coupling is HwR, the effective magnetic field generated from the recording layer to the reproducing layer by magnetostatic coupling is Hst, the coercive force of the reproducing layer is HcR, the ambient temperature is Ta, the mask temperature (at which a mask is started to be formed) is Tm, the maximum temperature is Tmax, and the medium temperature is T.

As illustrated in FIGS. 8B and 8C, in a portion (T<Tm) at a low temperature including room temperature and lower than the mask temperature, magnetized information in the recording layer is transferred to the reproducing layer by the exchange coupling force. In order for this to occur, conditions (I) to (III) below need only be satisfied:

$$Ta \leq T < Tm \quad (I)$$

$$HwR > Hst \quad (II)$$

$$HcR < HwR - Hst \quad (III)$$

HwR is represented by expression (IV) below:

$$HwR = \sigma w / 2 MsRhR \quad (IV)$$

where hR is the film thickness of the reproducing layer, MsR is the saturation magnetization of the reproducing layer, and σw is the interface domain wall energy between the reproducing layer and the recording layer.

In a high-temperature portion (T>Tm), the temperature reaches or approaches the Curie temperature of the intermediate layer (the state in which the intermediate layer has reached the Curie temperature is represented by black dots in FIG. 8B), and so the exchange coupling between the reproducing layer and the recording layer is broken.

Accordingly, the reproducing layer primarily undergoes only magnetostatic coupling from the recording layer. As a consequence, magnetized information in the recording layer is transferred to the reproducing layer by the magnetostatic coupling force. The conditions of this are represented by (V) to (VII) below:

$$T > Tm \quad (V)$$

$$HwR < Hst \quad (VI)$$

$$HcR < Hst - HwR \quad (VII)$$

That is, the exchange coupling force is mediated by the intermediate layer and acts more strongly than the magnetostatic coupling force. Therefore, the exchange coupling force acts on the reproducing layer until the intermediate layer reaches the Curie temperature. When the intermediate layer has reached the Curie temperature, however, the magnetization in the reproducing layer undergoes only the magnetostatic coupling force from the recording layer.

Since this medium has an antiparallel structure, the directions of magnetizations in the reproducing layer and the recording layer when they exchange-couple with each other are different from those when they magnetostatically couple with each other. In other words, the reproducing layer is a magnetic layer in which the direction of TM sublattice magnetization, which is predominant to exchange coupling, is opposite to the direction of overall magnetization, and the recording layer, is a magnetic layer in which the direction of TM sublattice magnetization, which is predominant to exchange coupling, is the same as the direction of overall magnetization, or vice versa.

In the medium of the present invention, therefore, in the exchange-coupled state, the TM sublattice magnetizations in the reproducing layer and the recording layer are aligned in the same direction. In the magnetostatically coupled state, the overall magnetizations are aligned in the same direction, and so the TM sublattice magnetizations are aligned in opposite directions. Accordingly, when the intermediate layer reaches the Curie temperature and breaks the exchanging force and the conditions (V) to (VII) are met, the magnetization in the reproducing layer is reversed by the magnetostatic coupling force, and the TM sublattice magnetizations in the reproducing layer and the recording layer are aligned in opposite directions.

This state is shown in FIG. 8B. FIG. 8B shows a case in which a ferrimagnetic rare earth-iron family alloy, which is rare earth element predominant, is used in the reproducing layer, and a ferrimagnetic rare earth-iron family alloy, which is iron family element predominant, is used in the recording layer. Hollow arrows indicate the overall magnetizations, and black arrows indicate the magnetic moments of the iron family element. Note that in FIG. 8B, an interference layer and a reflection layer are added to the basic arrangement.

TM sublattice magnetic moments are oriented in opposite directions in the reproducing layer and the recording layer. Consequently, the plane of polarization of light transmitted through the substrate is rotated in the reproducing layer and then rotated in the opposite direction in the recording layer, and the light returns to a magneto-optical recording/ reproduction apparatus. Therefore, if the rotational angle of the polarization plane of light polarized by the reproducing layer is equal to the rotational angle of the polarization plane of light polarized by the recording layer, the Kerr rotational angle is not influenced by these layers. That is, even when the incident light is transmitted through the reproducing layer, magnetized information in the magnetic layer is not detected.

Accordingly, no signal is detected in any recorded state at a temperature higher than the mask temperature Tm.

Consequently, as illustrated in FIG. 8A, an aperture portion, in which the recording mark is detected, and a mask portion, in which the recording mark is not detected, appear in the light spot. Since this means that the effective diameter of the light spot is decreased, it becomes possible to detect a recording mark much smaller than the light spot, which cannot be detected by conventional methods.

In the magneto-optical recording medium of the present invention, it is unnecessary to mask the magnetized information in the recording layer by using the reproducing layer and the layer having the same TM sublattice magnetic moment as the reproducing layer. Accordingly, these layers can be thinned to the extent to which reproduced signals do not deteriorate. As a consequence, the film thickness of each magnetic layer can be made much smaller than conventional film thicknesses.

A reflection layer can also be formed on the side away from the incident surface of the recording layer. When incident light is transmitted through the recording layer, this reflection layer reflects the light and prevents a decrease in the returning light quantity. The reflection layer also enhances the incident light between the magnetic layer and the reflection layer. In addition to the reflection layer, a dielectric substance such as SiN, $AlN_x$, $AlO_x$, $TaO_x$, or $SiO_x$ can be formed as an interference layer in order to enhance the interference effect. This interference layer must have a film thickness by which θk in the recording layer can be canceled and a desired reflectance can be obtained. It is also possible to form a thermal conduction layer for increasing the thermal conductivity in order to improve the domain shape when field modulation overwrite is performed. Al, AlTa, AlTi, AlCr, and Cu can be used as these reflection layer and thermal conduction layer. The reflection layer must be thinned to the extent to which light can be well reflected. Also, the reflection layer and the thermal conduction layer must be thinned to the extent to which the optical power is not too high. It is also possible to make a single layer function as both thermal conduction and reflection layers. Furthermore, the dielectric layer described above or a protective coat, made from a polymeric resin, can be formed as a protective film.

The magnetostatic coupling Hst described above is roughly directly proportional to the saturation magnetization in the recording layer and inversely proportional to the film thickness of the intermediate layer. Accordingly, to reliably reverse the magnetization in the reproducing layer in a low-temperature region, it is preferable to increase the saturation magnetization in the recording layer in the low-temperature region of a light spot and decrease the film thickness of the intermediate layer in the high-temperature region sufficiently to cause the intermediate layer to break the exchanging force. More specifically, the saturation magnetization in the recording layer is 50 emu/cc, and preferably 100 emu/cc or more at the Curie temperature of the intermediate layer. If the radius of a recording domain (recording mark) is larger than the film thickness of the recording layer, the magnetostatic field becomes weak and functions only around the recording domain. Therefore, it is effective to decrease the radius of the recording mark to be smaller than the film thickness.

The present invention will be described in more detail below by way of its experimental examples. However, the present invention is not limited to these experimental examples as long as the invention does not depart from the gist of the invention.

(Experimental Example 7)

Figure 7C:
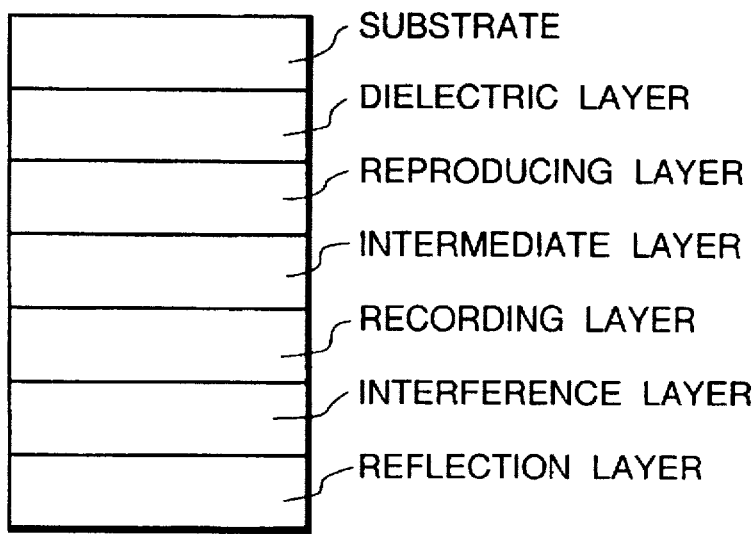

SiN, Tb, Gd, Fe, Co, and Al targets were attached to a DC magnetron sputtering apparatus, and an 80-nm thick SiN dielectric layer, a 10-nm thick GdFeCo reproducing layer, a 5-nm thick TbFeCo intermediate layer, a 15-nm thick TbFeCo recording layer, a 30-nm thick SiN interference layer, and a 60-nm thick Al reflection layer were sequentially formed on a pre-grooved polycarbonate substrate 130 mm in diameter, thereby obtaining a magneto-optical recording medium of the present invention having the arrangement shown in FIG. 7C.

The composition of the GdFeCo reproducing layer was so set that the layer was RE rich at room temperature, the compensation temperature was higher than the Curie temperature, and the Curie temperature was 300° C. or higher.

The composition of the TbFeCo intermediate layer was so set that the layer was TM rich at room temperature and the Curie temperature was 130° C.

The composition of the TbFeCo recording layer was so set that the layer was TM rich at room temperature and the Curie temperature was 220° C.

While this magneto-optical recording medium was rotated at a rotation speed of 2,600 rpm, a 12.5-MHz RF signal was written in the position of a radius of 37 mm so that the recording mark length was 0.40 μm, and a 6.4-MHz RF signal was written in the same position so that the recording mark length was 0.78 μm. The linear velocity of the medium at that time was 10 m/s. Thereafter, C/N ratios at the individual mark lengths were measured. The NA of an objective lens of an optical head was 0.55 and the laser wavelength was 780 nm.

Subsequently, while the linear velocity was changed, step by step, to 5 m/s (rotation speed 1,300 rpm, radius 37 mm), 10 m/s (rotation speed 2,400 rpm, radius 40 mm), 15 m/s (rotation speed 3,600 rpm, radius 40 mm), 20 m/s (rotation speed 3,600 rpm, radius 54 mm), and 25 m/s (rotation speed 3,980 rpm, radius 60 mm), 3.2-, 9.6-, and 12.8-MHz signals were recorded so that the mark length was 0.78 μm, and a minimum recording power Pw at which the C/N ratio was 48 dB was obtained. The reproducing power was set at a value (2.0 to 2.5 mW) at which the C/N ratio was a maximum at each recording power.

The results are shown in Table 3 to be presented later.

(Experimental Example 8)

By using the same film formation apparatus and the same film formation method as in Experimental Example 7, an 80-nm thick SiN dielectric layer, a 10-nm thick GdFeCo reproducing layer, a 5-nm GdFeCo intermediate layer, a 12-nm thick TbFeCo recording layer, a 30-nm thick SiN interference layer, and a 60-nm thick Al reflection layer were sequentially formed on a polycarbonate substrate, thereby obtaining a magneto-optical recording medium of the present invention having the arrangement shown in FIG. 7C.

The composition of the GdFeCo reproducing layer was so set that the layer was RE rich at room temperature, the compensation temperature was 250° C., and the Curie temperature was 300° C. or higher.

The composition of the GdFeCo intermediate layer was so set that the layer was TM rich at room temperature and the Curie temperature was 150° C.

The composition of the TbFeCo recording layer was so set that the layer was TM rich at room temperature and the Curie temperature was 250° C.

Following the same procedures as in Experimental Example 7, the recording and reproduction characteristics of this magneto-optical recording medium were measured. The measurement results are shown in Table 3.

(Experimental Example 9)

By using the same film formation apparatus and the same film formation method as in Experimental Example 7, an 800-nm thick SiN dielectric layer, a 12-nm thick GdDyFeCo reproducing layer, a 5-nm TbFeCo intermediate layer, a 11-nm thick DyFeCo recording layer, a 30-nm thick SiN interference layer, and a 60-nm thick Al reflection layer were sequentially formed on a polycarbonate substrate, thereby obtaining a magneto-optical recording medium of the present invention having the arrangement shown in FIG. 7C.

The composition of the GdDyFeCo reproducing layer was so set that the layer was RE rich at room temperature, the compensation temperature was 260° C., and the Curie temperature was 300° C. or higher.

The composition of the GdFeCo intermediate layer was so set that the layer was TM rich at room temperature and the Curie temperature was 120° C.

The composition of the DyFeCo recording layer was so set that the layer was TM rich at room temperature and the Curie temperature was 230° C.

Following the same procedures as in Experimental Example 7, the recording and reproduction characteristics of this magneto-optical recording medium were measured. The measurement results are shown in Table 3.

(Comparative Example 5)

By using the same film formation apparatus and the same film formation method as in Experimental Example 7, an 80-nm thick SiN dielectric layer, an 80-nm thick TbFeCo recording layer, and a 70-nm thick SiN protective layer were sequentially formed on a polycarbonate substrate, thereby obtaining a conventional non-super-resolution magneto-optical recording medium. The refractive index of each SiN layer was 2.1.

The composition of the TbFeCo recording layer was so set that the layer was TM rich at room temperature and the Curie temperature was 250° C.

Following the same procedures as in Experimental Example 7, the recording and reproduction characteristics of this magneto-optical recording medium were measured. The measurement results are shown in Table 3.

No super-resolution effect was obtained by this conventional medium.

(Comparative Example 6)

By using the same film formation apparatus and the same film formation method as in Experimental Example 7, an 80-nm thick SiN dielectric layer, a 30-nm thick GdFeCo reproducing layer, a 10-nm thick TbFeCo intermediate layer, a 40-nm thick TbFeCo recording layer, and a 70-nm thick SiN protective layer were sequentially formed on a polycarbonate substrate, thereby obtaining a conventional super-resolution magneto-optical recording medium. The refractive index of each SiN layer was 2.1.

The composition of the GdFeCo reproducing layer was so set that the layer was TM rich at room temperature and the Curie temperature was 300° C. or higher.

The composition was he TbFeCo intermediate layer was so set that the layer was TM rich at room temperature and the Curie temperature was 140° C.

The composition of the TbFeCo recording layer was so set that the layer was TM rich at room temperature and the Curie temperature was 250° C.

Following the same procedures as in Experimental Example 7, the recording and reproduction characteristics of this magneto-optical recording medium were measured. Note that only in this Comparative Example 6, a reproduction magnetic field of 500 Oe was applied during reproduction. The measurement results are shown in Table 3.

Comparing the results of Comparative Examples 5 and 6 with the results of Experimental Examples 7 to 9 shows that super-resolution recording/reproduction in which the C/N ratio was 45 dB or higher with a mark length of 0.4 µm was possible in the magneto-optical recording media of the present invention even if the film thicknesses of the magnetic layers were small. Also, the laser power necessary for recording was much lower than that in the comparative examples even at a high linear velocity. The maximum output on the surface of a medium of a semiconductor laser used in present magneto-optical recording apparatuses is approximately 10 mW. Accordingly, while the possible linear velocity was a maximum of 17 m/s by the conventional magneto-optical recording media in the comparative examples, it was possible to increase the linear velocity to about 25 m/s in the experimental examples of the present invention. This indicates that when the output of the semiconductor laser is further increased, the difference between the present invention and the conventional technologies tends to increase more and more. This demonstrates that the magneto-optical recording media of the present invention can achieve high-speed recording compared to the conventional media.

TABLE 3

| Items | C/N (dB) | C/N (dB) | Pw(mW) | Pw (mW) | Pw (mW) | Pw (mW) | Pw (mW) |
|---|---|---|---|---|---|---|---|
| Mark length (µm) | 0.78 | 0.40 | 0.78 | 0.78 | 0.78 | 0.78 | 0.78 |
| Linear velocity (m/s) | 10 | 10 | 5 | 10 | 15 | 20 | 25 |
| Experimental Example 7 | 48 | 46 | 6.0 | 7.8 | 8.0 | 9.0 | 10.6 |
| Experimental Example 8 | 49 | 46 | 6.0 | 7.6 | 8.0 | 9.0 | 10.5 |
| Experimental Example 9 | 50 | 45 | 6.0 | 7.5 | 8.1 | 9.2 | 10.0 |
| Comparative Example 5 | 49 | 30 | 6.0 | 8.0 | 10.0 | 12.0 | 14.0 |
| Comparative Example 6 | 48 | 45 | 6.0 | 8.1 | 10.2 | 12.2 | 14.0 |

What is claimed is:

1. A magneto-optical recording medium comprising:

a reproducing layer for contributing to reproduction;

a recording layer for storing information; and an intermediate layer disposed between said reproducing layer and said recording layer, wherein said intermediate layer magnetostatically couples said reproducing layer and said recording layer in an entire area between said reproducing layer and said recording layer, wherein said reproducing layer has a compensation temperature between room temperature and a Curie temperature thereof, and the sublattice magnetizations in said reproducing layer and said recording layer are oriented in opposite directions at a temperature lower than the compensation temperature and are oriented in the same direction at a temperature higher than the compensation temperature.

2. A medium according to claim 1, wherein in said reproducing layer, a rare earth element is predominant at room temperature, and in said recording layer, an iron family transition metal element is predominant at room temperature.

3. A magneto-optical recording medium comprising:

a reproducing layer for contributing to reproduction;

a recording layer for storing information; and an intermediate layer disposed between said reproducing layer and said recording layer, wherein said intermediate layer magnetostatically couples said reproducing layer and said recording layer in an entire area between said reproducing layer and said recording layer, wherein said reproducing layer has a compensation temperature between room temperature and a Curie temperature thereof, and the sublattice magnetizations of said reproducing layer and said recording layer are oriented in the same direction at a temperature lower than the compensation temperature and are oriented in opposite directions at a temperature higher than the compensation temperature.

4. A medium according to claim 3, wherein in said reproducing layer, an iron family transition metal element is predominant at room temperature, and in said recording layer, an iron family transition metal element is predominant at room temperature.

5. A magneto-optical recording medium comprising:

a reproducing layer for contributing to reproduction;

a recording layer for storing information; and an intermediate layer disposed between said reproducing layer and said recording layer, wherein said intermediate layer is made from a phase transition material which reversibly changes a phase between anti-ferromagnetism and ferromagnetism, wherein said intermediate layer is made from a magnetic phase transition material which is anti-ferromagnetic at room temperature and becomes ferromagnetic when a temperature is raised, and said reproducing layer and said recording layer magnetooptically couple with each other in a portion in which said intermediate layer is anti-ferromagnetic and exchange couple with each other in a portion in which said intermediate layer is ferromagnetic.

6. A medium according to claim 5, wherein in said reproducing layer, a rare earth element is predominant at room temperature, and in said recording layer, an iron family transition metal element is predominant at room temperature.

7. A magneto-optical recording medium comprising:

a reproducing layer for contributing to reproduction;

a recording layer for storing information; and an intermediate layer disposed between said reproducing layer and said recording layer, wherein said intermediate layer is made from a phase transition material which reversibly changes a phase between anti-ferromagnetism and ferromagnetism, wherein said intermediate layer is made from a magnetic phase transition material which is ferromagnetic at room temperature and becomes anti-ferromagnetic when a temperature is raised, and wherein said reproducing layer and said recording layer magnetostatically couple with each other in a portion in which said intermediate layer is anti-ferromagnetic and exchange-coupled with each other in a portion in which said intermediate layer is ferromagnetic.

8. A medium according to claim 7, wherein in said reproducing layer, a rare earth element is predominant at room temperature, and in said recording layer, an iron family transition metal element is predominant at room temperature.

9. A magneto-optical recording medium comprising:

a reproducing layer for contributing to reproduction;

a recording layer for storing information; and an intermediate layer disposed between said reproducing layer and said recording layer, wherein said intermediate layer is made from a phase transition material which reversibly changes a phase between anti-ferromagnetism and ferromagnetism, wherein said magnetic phase transition material contains FeRh as a main constituent.

10. A magneto-optical recording medium comprising:

a reproducing layer for contributing to reproduction;

a recording layer for storing information; and an intermediate layer disposed between said reproducing layer and said recording layer, wherein said reproducing layer, said recording layer, and said intermediate layer are made from an amorphous alloy consisting of rare earth-iron family transition metal elements, wherein a Curie temperature of said intermediate layer is higher than room temperature and lower than the Curie temperatures of said reproducing layer and said recording layer, wherein said reproducing layer and said recording layer magnetostatically couple with each other in a portion in which a temperature is equal to or higher than the Curie temperature of said intermediate layer and exchange-couple with each other via said intermediate layer in a remaining portion.

11. A medium according to claim 10, wherein in said reproducing layer, a rare earth element is predominant at room temperature, and in said recording layer, an iron family transition metal element is predominant at room temperature.

12. An optical information reproducing method for reproducing information using a light spot from a magneto-optical recording medium including a reproducing layer for contributing to reproduction, a recording layer for storing the information, and an intermediate layer arranged between the reproducing layer and the recording layer, wherein the intermediate layer magnetostatically couples the reproducing layer and the recording layer in an entire area between the reproducing layer and the recording layer, wherein the reproducing layer has a compensation temperature between room temperature and a Curie temperature thereof, and the sublattice magnetizations in the reproducing layer and the recording layer are oriented in opposite directions at a temperature lower than the compensation temperature and are oriented in the same direction at a temperature higher than the compensation temperature, said method comprising the steps of:

forming a light spot on the reproducing layer;

setting at least a partial region in the light spot into a magnetostatically coupled state in which the sublattice magnetizations in the reproducing layer and the recording layer are oriented in opposite directions and setting a remaining region in the light spot into a state in which the sublattice magnetizations in the reproducing layer and the recording layer are oriented in the same direction; and reproducing the information by detecting reflected light of the light spot.

13. An optical information reproducing method for reproducing information using a light spot from a magneto-optical recording medium including a reproducing layer for contributing to reproduction, a recording layer for storing the information, and an intermediate layer arranged between the reproducing layer and the recording layer, wherein the intermediate layer magnetostatically couples the reproducing layer and the recording layer in an entire area between the reproducing layer and the recording layer, wherein the reproducing layer has a compensation temperature between room temperature and a Curie temperature thereof, and the sublattice magnetizations of the reproducing layer and the recording layer are oriented in the same direction at a temperature lower than the compensation temperature and are oriented in opposite directions at a temperature higher than the compensation temperature, said method comprising the steps of:

forming a light spot on the reproducing layer;

setting at least a partial region in the light spot into a magnetostatically coupled state in which the sublattice magnetizations in the reproducing layer and the recording layer are oriented in opposite directions and setting a remaining region in the light spot into a state in which the sublattice magnetizations in the reproducing layer and the recording layer are oriented in the same direction; and reproducing the information by detecting reflected light of the light spot.

14. An optical information reproducing method for reproducing information using a light spot from a magneto-optical recording medium including a reproducing layer for contributing to reproduction, a recording layer for storing the information, and an intermediate layer arranged between the reproducing layer and the recording layer, wherein the intermediate layer is made from a phase transition material which reversibly changes a phase between anti-ferromagnetism and ferromagnetism, wherein the intermediate layer is made from a magnetic phase transition material which is anti-ferromagnetic at room temperature and becomes ferromagnetic when a temperature is raised, and the reproducing layer and the recording layer magnetooptically couple with each other in a portion in which the intermediate layer is anti-ferromagnetic and exchange couple with each other in a portion in which the intermediate layer is ferromagnetic, said method comprising the steps of:

forming a light spot on the reproducing layer;

setting at least a partial region in the light spot into a magnetostatically coupled state in which the sublattice magnetizations in the reproducing layer and the recording layer are oriented in opposite directions and setting a remaining region in the light spot into a state in which the sublattice magnetizations in the reproducing layer and the recording layer are oriented in the same direction; and reproducing the information by detecting reflected light of the light spot.

15. An optical information reproducing method for reproducing information using a light spot from a magneto-optical recording medium including a reproducing layer for contributing to reproduction, a recording layer for storing the information, and an intermediate layer arranged between the reproducing layer and the recording layer, wherein the intermediate layer is made from a phase transition material which reversibly changes a phase between anti-ferromagnetism and ferromagnetism, wherein the intermediate layer is made from a magnetic phase transition material which is ferromagnetic at room temperature and becomes anti-ferromagnetic when a temperature is raised, and wherein the reproducing layer and the recording layer magnetostatically couple with each other in a portion in which the intermediate layer is anti-ferromagnetic and exchange-coupled with each other in a portion in which the intermediate layer is ferromagnetic, said method comprising the steps of:

forming a light spot on the reproducing layer;

setting at least a partial region in the light spot into a magnetostatically coupled state in which the sublattice magnetizations in the reproducing layer and the recording layer are oriented in opposite directions and setting a remaining region in the light spot into a state in which the sublattice magnetizations in the reproducing layer and the recording layer are oriented in the same direction; and reproducing the information by detecting reflected light of the light spot.

16. An optical information reproducing method for reproducing information using a light spot from a magneto-optical recording medium including a reproducing layer for contributing to reproduction, a recording layer for storing the information, and an intermediate layer arranged between the reproducing layer and the recording layer, wherein the intermediate layer is made from a phase transition material which reversibly changes a phase between anti-ferromagnetism and ferromagnetism, wherein the magnetic phase transition material contains FeRh as a main constituent, said method comprising the steps of:

forming a light spot on the reproducing layer;

setting at least a partial region in the light spot into a magnetostatically coupled state in which the sublattice magnetizations in the reproducing layer and the recording layer are oriented in opposite directions and setting a remaining region in the light spot into a state in which the sublattice magnetizations in the reproducing layer and the recording layer are oriented in the same direction; and reproducing the information by detecting reflected light of the light spot.

17. An optical information reproducing method for reproducing information using a light spot from a magneto-optical recording medium including a reproducing layer for contributing to reproduction, a recording layer for storing the information, and an intermediate layer arranged between the reproducing layer and the recording layer, wherein the reproducing layer, the recording layer, and the intermediate layer are made from an amorphous alloy consisting of rare earth-iron family transition metal elements, wherein a Curie temperature of the intermediate layer is higher than room temperature and lower than the Curie temperatures of the reproducing layer and the recording layer, wherein the reproducing layer and the recording layer magnetostatically couple with each other in a portion in which a temperature is equal to or higher than the Curie temperature of the intermediate layer and exchange-couple with each other via the intermediate layer in a remaining portion, said method comprising the steps of:

forming a light spot on the reproducing layer;

setting at least a partial region in the light spot into a magnetostatically coupled state in which the sublattice magnetizations in the reproducing layer and the recording layer are oriented in opposite directions and setting a remaining region in the light spot into a state in which the sublattice magnetizations in the reproducing layer and the recording layer are oriented in the same direction; and reproducing the information by detecting reflected light of the light spot.

* * * * *

UNITED STATES PATENT AND TRADEMARK OFFICE
CERTIFICATE OF CORRECTION

PATENT NO. : 5,717,662

DATED : February 10, 1998

INVENTOR(S) : NAOKI NISHIMURA

It is certified that error appears in the above-identified patent and that said Letters Patent is hereby corrected as shown below:

COLUMN 5:

Line 46, "characteristics, of the medium" should read --characteristics of the medium,--.

COLUMN 6:

Line 36, "consequence" should read --consequence,--.

COLUMN 9:

Line 20, "light" should read --light is--.

COLUMN 12:

Line 44, "is" should be deleted and "made" should read --is made--.

COLUMN 16:

Line 2, "these" should read --the--.

COLUMN 20:

Line 32, "well penetrate" should read --penetrate well--.

Line 53, "Note" should read --¶ Note--.

UNITED STATES PATENT AND TRADEMARK OFFICE
CERTIFICATE OF CORRECTION

PATENT NO. : 5,717,662

DATED : February 10, 1998

INVENTOR(S) : NAOKI NISHIMURA

It is certified that error appears in the above-identified patent and that said Letters Patent is hereby corrected as shown below:

COLUMN 23:

Line 34, "these" should read --the--.

COLUMN 25:

Line 56, "was he" should read --of the--.

Signed and Sealed this

Sixth Day of October, 1998

Attest:

BRUCE LEHMAN

*Attesting Officer*  *Commissioner of Patents and Trademarks*